(12) United States Patent
Saiki et al.

(10) Patent No.: US 11,946,943 B2
(45) Date of Patent: Apr. 2, 2024

(54) SUBSTRATE FOR SAMPLE ANALYSIS, SAMPLE ANALYSIS DEVICE, SAMPLE ANALYSIS SYSTEM, AND METHOD FOR CONTROLLING SAMPLE ANALYSIS DEVICE

(71) Applicant: PHC HOLDINGS CORPORATION, Tokyo (JP)

(72) Inventors: Hiroshi Saiki, Ehime (JP); Yoshimitsu Momoi, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 363 days.

(21) Appl. No.: 16/959,912

(22) PCT Filed: Feb. 4, 2019

(86) PCT No.: PCT/JP2019/003820
§ 371 (c)(1),
(2) Date: Jul. 2, 2020

(87) PCT Pub. No.: WO2019/156017
PCT Pub. Date: Aug. 15, 2019

(65) Prior Publication Data
US 2021/0072267 A1    Mar. 11, 2021

(30) Foreign Application Priority Data
Feb. 9, 2018    (JP) .................. 2018-021823

(51) Int. Cl.
*G01N 35/00*    (2006.01)
*G01N 35/10*    (2006.01)

(52) U.S. Cl.
CPC . *G01N 35/00029* (2013.01); *G01N 35/00584* (2013.01); *G01N 35/1002* (2013.01); *G01N 2035/00495* (2013.01)

(58) Field of Classification Search
CPC ....... G01N 35/00029; G01N 35/00584; G01N 35/1002; G01N 2035/00495
See application file for complete search history.

(56) References Cited

U.S. PATENT DOCUMENTS 5,472,603 A        12/1995   Schembri
2009/0286327 A1*   11/2009   Cho ...................... G01N 21/07
                                                     435/287.1

(Continued)

FOREIGN PATENT DOCUMENTS

EP    2096444 A1    9/2009
EP    2175278 A1    4/2010

(Continued)

OTHER PUBLICATIONS

International Search Report issued in corresponding International Patent Application No. PCT/JP2019/003820, dated Apr. 9, 2019, with English translation.

(Continued)

*Primary Examiner* — Matthew D Krcha
*Assistant Examiner* — Tingchen Shi
(74) *Attorney, Agent, or Firm* — Rimon P.C.

(57) ABSTRACT

A sample analysis substrate in which transfer of a liquid is effected through rotational motions, including: a substrate having a rotation axis; a first retention chamber being located in the substrate and retaining a diluent; a measurement chamber being located in the substrate; at least one reagent; a reagent chamber being located in the substrate and having the at least one reagent disposed therein, the reagent chamber being connected to the measurement chamber; and a first diluent path being located in the substrate, and connecting the first retention chamber and the measurement chamber or reagent chamber.

13 Claims, 26 Drawing Sheets

(56) References Cited

U.S. PATENT DOCUMENTS

| | | |
|---|---|---|
| 2009/0317896 A1 | 12/2009 | Yoo |
| 2010/0074801 A1 | 3/2010 | Saiki |
| 2010/0184228 A1 | 7/2010 | Saiki |
| 2010/0240142 A1 | 9/2010 | Saiki et al. |
| 2011/0126646 A1* | 6/2011 | Saiki .................. B01F 33/3017 73/864.81 |
| 2017/0131304 A1* | 5/2017 | Johno ................ G01N 33/5302 |

FOREIGN PATENT DOCUMENTS

| | | |
|---|---|---|
| JP | 2009-109428 A | 5/2009 |
| JP | 2009-186247 A | 8/2009 |
| JP | 2009-545742 A | 12/2009 |
| JP | 2011-137673 A | 7/2011 |
| WO | 93/19827 A1 | 10/1993 |

OTHER PUBLICATIONS

Extended European Search Report issued in corresponding European Patent Application No. 19750396.4, dated Feb. 26, 2021.

* cited by examiner 29
28

29
28

SUBSTRATE FOR SAMPLE ANALYSIS, SAMPLE ANALYSIS DEVICE, SAMPLE ANALYSIS SYSTEM, AND METHOD FOR CONTROLLING SAMPLE ANALYSIS DEVICE

CROSS-REFERENCE OF RELATED APPLICATIONS

This application is the U.S. National Phase under 35 U.S.C. § 371 of International Patent Application No. PCT/JP2019/003820, filed on Feb. 4, 2019, which in turn claims the benefit of Japanese Application No. 2018-021823, filed on Feb. 9, 2018, the entire disclosures of which Applications are incorporated by reference herein.

TECHNICAL FIELD

The present application relates to a sample analysis substrate, a sample analysis device, a sample analysis system, and a method for controlling a sample analysis device.

BACKGROUND ART

Methods have been known which analyze a liquid that is collected from an organism or the like by using a sample analysis substrate in which liquid channels are formed. A sample analysis substrate is able to control a fluid by using a rotation device. For example, Patent Document 1 discloses a technique that utilizes a disk-shaped sample analysis substrate, on which channels, chambers, and the like are formed, where the sample analysis substrate is allowed to rotate, etc., thereby effecting transfer, distribution, mixing of solutions, analysis of components within an analyte solution, and so on.

CITATION LIST

Patent Literature

[Patent Document 1] Japanese Laid-Open Patent Publication No. 2009-186247

SUMMARY OF INVENTION

Technical Problem

In the aforementioned method of analysis, a further enhancement of measurement accuracy is needed. A non-limiting and illustrative embodiment of the present application provides a sample analysis substrate, a sample analysis device, a sample analysis system, and a method for controlling a sample analysis device that enable an analysis with high measurement accuracy.

Solution to Problem

A sample analysis substrate according to the present disclosure, in which transfer of a liquid is effected through rotational motions, comprises:
a substrate having a rotation axis;
a first retention chamber being located in the substrate and retaining a diluent;
a measurement chamber located in the substrate;
at least one reagent;
a reagent chamber being located in the substrate and having the at least one reagent disposed therein, the reagent chamber being connected to the measurement chamber;
a first diluent path being located in the substrate, and connecting the first retention chamber and the measurement chamber or reagent chamber.

Advantageous Effects of Invention

According to the present disclosure, a reagent can be first mixed with a diluent into a solution state, whereby fluctuations in the reaction between the reagent and the analyte can be suppressed, and an enhanced measurement accuracy can be obtained.

DESCRIPTION OF EMBODIMENTS

Figure 1A:
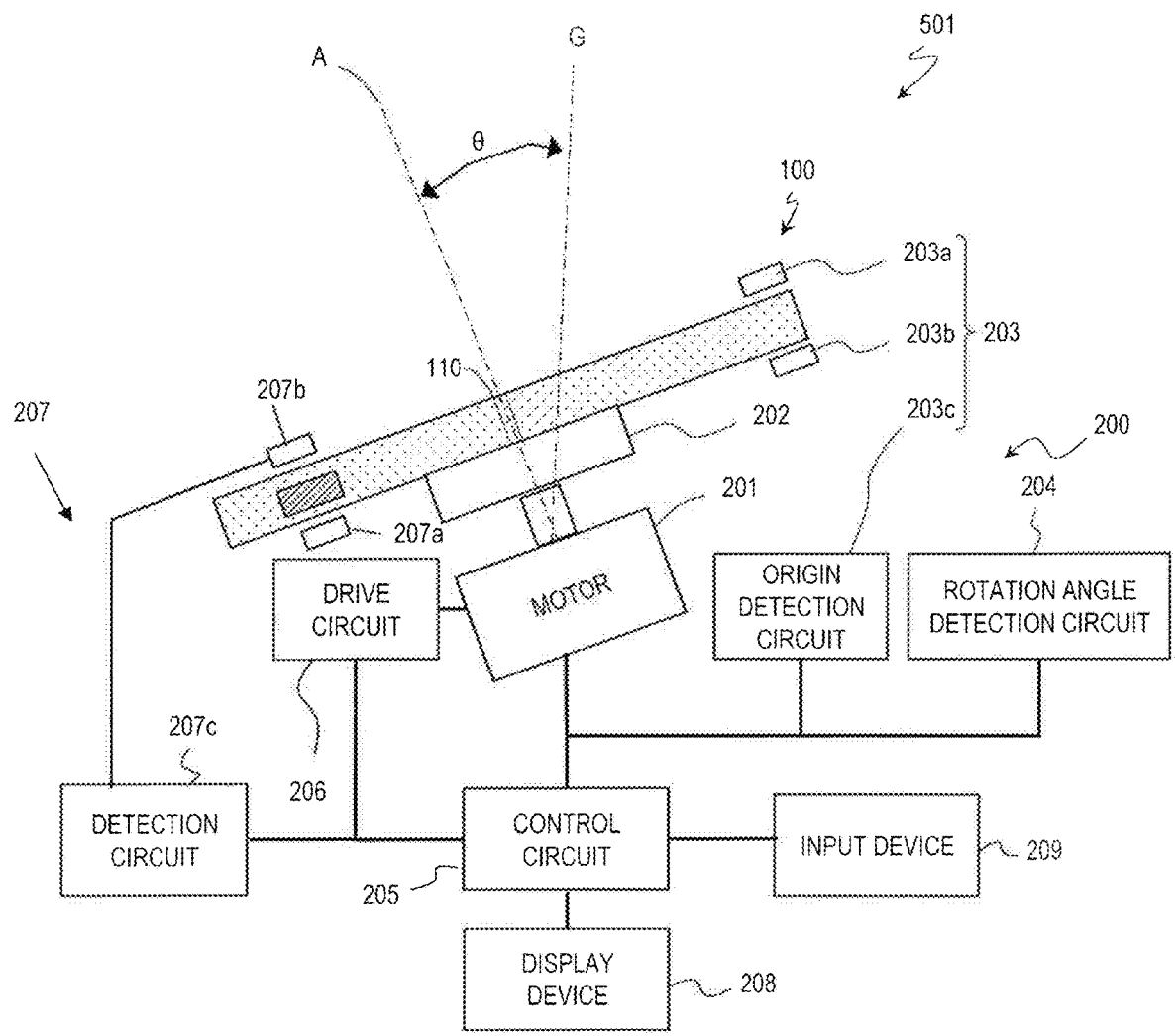
FIG. 1A is a block diagram showing the overall configuration of a sample analysis system.

In outline, a sample analysis substrate, a sample analysis device, a sample analysis system, and a method for controlling a sample analysis device according to the present disclosure are as follows.

Item 1

A sample analysis substrate in which transfer of a liquid is effected through rotational motions, comprising:
a substrate having a rotation axis;
a first retention chamber being located in the substrate and retaining a diluent;
a measurement chamber located in the substrate;
at least one reagent;
a reagent chamber being located in the substrate and having the at least one reagent disposed therein, the reagent chamber being connected to the measurement chamber; and
a first diluent path being located in the substrate, and connecting the first retention chamber and the measurement chamber or reagent chamber.

Item 2

The sample analysis substrate of Item 1, wherein the reagent chamber includes a capillary region, the reagent being disposed in the capillary region.

Item 3

The sample analysis substrate of Item 1 or 2, further comprising:
second retention chamber being located in the substrate and retaining a diluent;
an analyte chamber being located in the substrate and retaining an analyte;
a mixing chamber being located in the substrate;
an analyte path being located in the substrate and connecting the analyte chamber and the mixing chamber;
a second diluent path being located in the substrate and connecting the second retention chamber and the mixing chamber; and
a mixed solution path being located in the substrate and connecting the mixing chamber and the measurement chamber.

Item 4

The sample analysis substrate of Item 1 or 2, further comprising:
an analyte chamber being located in the substrate and retaining an analyte; and
an analyte path being located in the substrate and connecting the analyte chamber and the measurement chamber.

Item 5

The sample analysis substrate of Items 1 to 4, wherein,
the measurement chamber and the reagent chamber do not have any air holes;
the first diluent path includes an inlet and an outlet, the outlet being a capillary channel connected to the measurement chamber, such that the outlet is located on an outer peripheral side of the rotation axis relative to the inlet, and that the capillary channel has a siphon shape which is bent toward an inner peripheral side relative to the inlet,
the mixed solution path includes: a capillary channel having an inlet and an outlet, the outlet being connected to the measurement chamber; and a chamber being connected to the inlet of the capillary channel and having an air hole.

Item 6

The sample analysis substrate of any of Items 1 to 5, wherein an outlet of the capillary channel of the first diluent path is connected to the reagent chamber.

Item 7

The sample analysis substrate of Item 2, comprising a plurality of said reagents, the plurality of reagents being disposed along a peripheral direction in the capillary region of the reagent chamber.

Item 8

The sample analysis substrate of Item 7, wherein the measurement chamber includes a portion that is located closer to an outer peripheral side than are a portion of the capillary region of the reagent chamber in which the plurality of reagents are disposed.

Item 9

A sample analysis system comprising:
the sample analysis substrate of Item 2; and
a sample analysis device including:
a motor having a turntable on which the sample analysis substrate is mountable, the motor rotating the sample analysis substrate around a rotation axis inclined by an angle which is greater than 0° and smaller than or equal to 90° from the direction of gravity;
a rotation angle detection circuit to detect an angle of a shaft of the motor;
an origin detector to detect an origin to serve as a reference for the analysis substrate;
a driver driving circuit to, based on a result of detection by the rotation angle detection circuit, control rotation of the motor and an angle of the motor when stopping; and
a control circuit including an arithmetic unit, a memory, and a program which is stored in the memory and configured so as to be executable by the arithmetic unit, wherein based on the program, the control circuit controls operations of the motor, the rotation angle detection circuit, the origin detector, and the driver driving circuit,
the program comprising the steps of:
when the sample analysis substrate having the diluent retained in the first retention chamber is mounted on the turntable of the sample analysis device,
(a) rotating the sample analysis substrate to transfer the diluent retained in the first retention chamber to the measurement chamber via the first diluent path;
(b) stopping rotation of the sample analysis substrate to move the diluent in the measurement chamber to the capillary region of the reagent chamber to allow the plurality of reagents to be dissolved in the diluent, thus preparing a reagent solution; and
(c) rotating the sample analysis substrate to move the reagent solution in the reagent chamber to the measurement chamber.

Item 10

The sample analysis system of Item 9, wherein the program further comprises, between step (b) and step (c), a step of swinging the sample analysis substrate.

Item 11

The sample analysis system of Item 9, wherein the program repeats step (b) and step (c) a plurality of times.

Item 12

A sample analysis device comprising:
a motor having a turntable on which the sample analysis substrate of Item 2 is mountable, the motor rotating the sample analysis substrate around a rotation axis inclined by an angle which is greater than 0° and smaller than or equal to 90° from the direction of gravity;
a rotation angle detection circuit to detect an angle of a shaft of the motor, and an origin detector to detect an origin to serve as a reference for the analysis substrate;
a driver driving circuit to, based on a result of detection by the rotation angle detection circuit, control rotation of the motor and an angle of the motor when stopping; and
a control circuit including an arithmetic unit, a memory, and a program which is stored in the memory and configured so as to be executable by the arithmetic unit, wherein based on the program, the control circuit controls operations of the motor, the rotation angle detection circuit, the origin detector, and the driver driving circuit,
the program comprising the steps of:
when the sample analysis substrate having the diluent retained in the first retention chamber is mounted on the turntable,
(a) rotating the sample analysis substrate to transfer the diluent retained in the first retention chamber to the measurement chamber via the first diluent path;
(b) stopping rotation of the sample analysis substrate to move the diluent in the measurement chamber to the capillary region of the reagent chamber to allow the plurality of reagents to be dissolved in the diluent, thus preparing a reagent solution; and
(c) rotating the sample analysis substrate to move the reagent solution in the reagent, chamber to the measurement chamber.

Item 13

The sample analysis device of Item 12, wherein the program further comprises, between step (b) and step (c), a step of swinging the sample analysis substrate.

Item 14

The sample analysis device of Item 12, wherein the program repeats step (b) and step (c) a plurality of times.

Item 15

A method for controlling a sample analysis device, the sample analysis device including:
a motor having a turntable on which the sample analysis substrate of Item 2 is mountable, the motor rotating the sample analysis substrate around a rotation axis inclined by an angle which is greater than 0° and smaller than or equal to 90° from the direction of gravity;

a rotation angle detection circuit to detect an angle of a shaft of the motor;

an origin detector to detect an origin to serve as a reference for the analysis substrate;

a driver driving circuit to, based on a result of detection by the rotation angle detection circuit, control rotation of the motor and an angle or the motor when stopping; and a control circuit including an arithmetic unit, memory, and a program which is stored in the memory and configured so as to be executable by the arithmetic unit, wherein based on the program, the control circuit controls operations of the motor, the rotation angle detection circuit, the origin detector, and the driver driving circuit, the method comprising the steps of:

when the sample analysis substrate having the diluent retained in the first retention chamber is mounted on the turntable, (a) rotating the sample analysis substrate to transfer the diluent retained in the first retention chamber to the measurement chamber via the first diluent path;

(b) stopping rotation of the sample analysis substrate to move the diluent in the measurement chamber to the capillary region of the reagent chamber to allow the plurality of reagents to be dissolved in the diluent, thus preparing a reagent solution; and (c) rotating the sample analysis substrate to move the reagent solution in lee reagent chamber to the measurement chamber.

Item 16

The method for controlling a sample analysis device of Item 15, further comprising, between step (b) and step (c), a step of swinging the sample analysis substrate.

Item 17

The method for controlling a sample analysis device of Item 15, wherein the program repeats step (b) and step (c) a plurality of times.

Figure 1B:
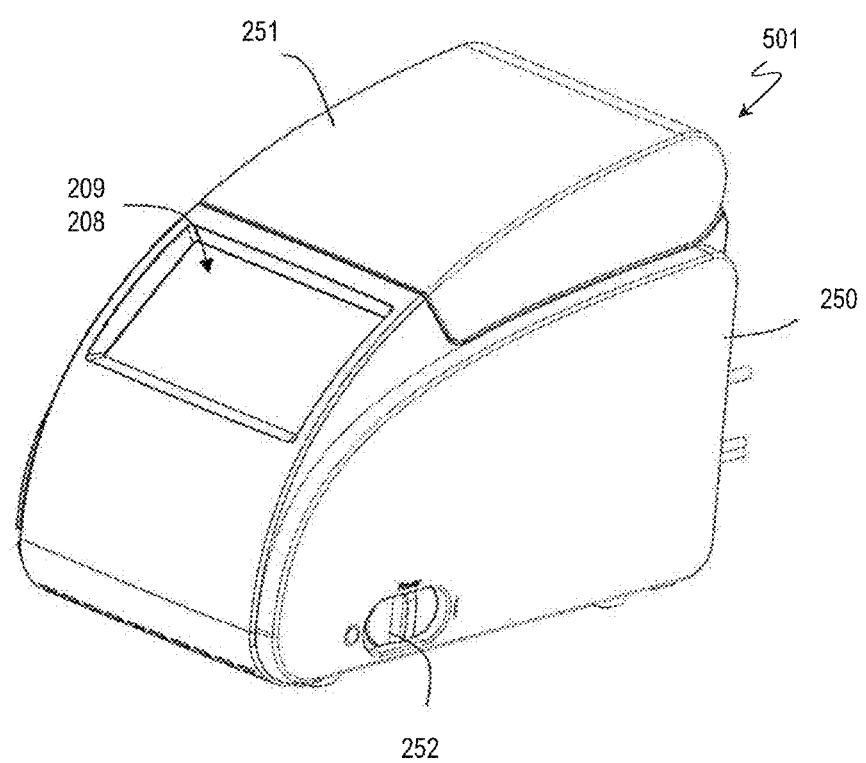
FIG. 1B is a perspective view of a sample analysis device.
Figure 1C:
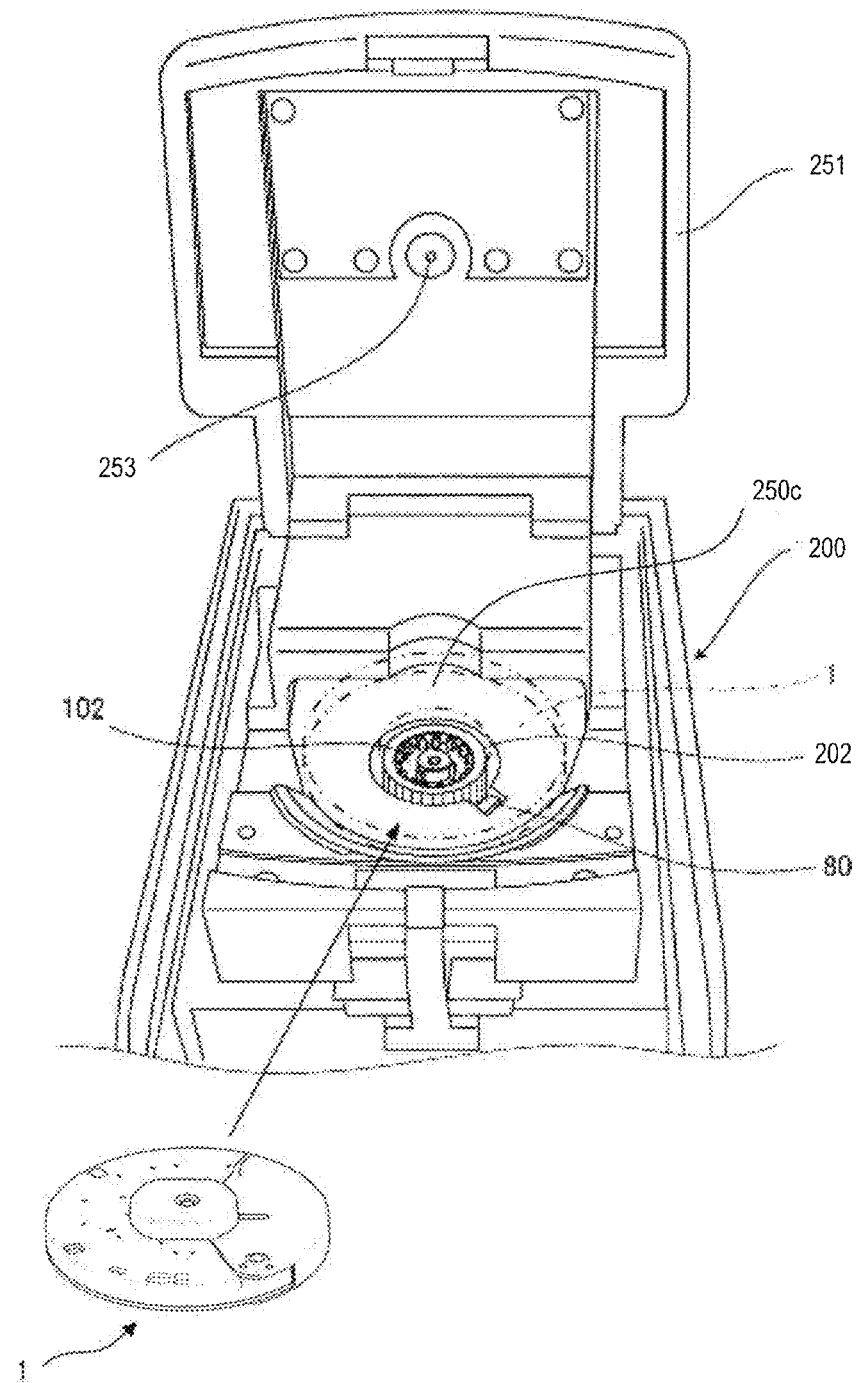
FIG. 1C is a perspective view of the sample analysis device with its door open.

Hereinafter, with reference to the drawings, a sample analysis substrate, a sample analysis device, a sample analysis system, and a method for controlling a sample analysis device according to the present embodiment will be described in detail. FIG. 1A is a block diagram showing the overall configuration of a sample analysis system 501, and FIG. 1B is a perspective view showing an exemplary appearance of a sample analysis device 200. FIG. 1C is a perspective view showing the sample analysis device 200 with its door open. The sample analysis system 501 includes the sample analysis device 200 and a sample analysis substrate 1.

The sample analysis device 200 has a housing 250 that includes a door 251 which is capable of opening and closing. The housing 250 has an accommodation 250*c* in which the sample analysis substrate 1 is accommodated so as to be capable of rotation. In the accommodation 250*c*, a motor 201 having a turntable 202 is disposed. While the door 251 is open, the sample analysis substrate 1 can be attached to or detached from the turntable 202 within the accommodation 250*c*. As the door 251 is closed, the door 251 shields the accommodation 250*c* from light so that no light may enter the accommodation 250*c* from the outside. Moreover, the sample analysis substrate 1 is sandwiched between a clamper 253 provided on the door 251 and the turntable 202. On the housing 250, a power switch 252 for starting or stopping the sample analysis device 200 and a display device 208 are provided. The display device 208 is a touch screen panel, and may double as an input device 209.

The sample analysis device 200 includes a motor 201, an origin detector 203, a rotation angle detection circuit 204, a control circuit 205, a drive circuit 206, and an optical measurement unit 207.

The motor 201 includes a shaft A which is tilted from the direction of gravity G at an angle θ which is greater than 0° but not more than 90°, and rotates the sample analysis substrate 1 mounted on the turntable 202 around the shaft A. Since the shaft A is tilted, not only a centrifugal force due to rotation but a gravity-based movement can also be utilized for causing a transfer of any liquid in the sample analysis substrate 1. The angle of tilt of the shaft A with respect to the direction of gravity is preferably 5° or more, more preferably not less than 10° and not more than 45°, and still more preferably not less than 20° and not more than 30°. The motor 201 may be a DC motor, a brushless motor, an ultrasonic motor, or the like, for example.

The drive circuit 206 rotates the motor 201. Specifically, based on an instruction from the control circuit 205, sample analysis substrate 1 is rotated clockwise or counterclockwise. Alternatively, from a predetermined stop position, the sample analysis substrate may be swung through right-and-left reciprocations around the shaft A, with a predetermined range of amplitude and period.

The rotation angle detection circuit 204 detects a rotation angle of the shaft A of the motor 201. For example, the rotation angle detection circuit 204 may be a rotary encoder that is attached to the shaft A. When the motor 201 is a brushless motor, the rotation angle detection circuit 204 may include Hall generator that is part of the brushless motor and a detection circuit which receives air output signal from the Hall generator and outputs a rotation angle of the shaft A. The control circuit 205, described later, may double as a detection circuit. In the case where the angle of attachment of the sample analysis substrate 1 is fixed with respect to the turntable 202, the rotation angle of the shaft A will be identical to the rotation angle of the sample analysis substrate 1.

Figure 1D:
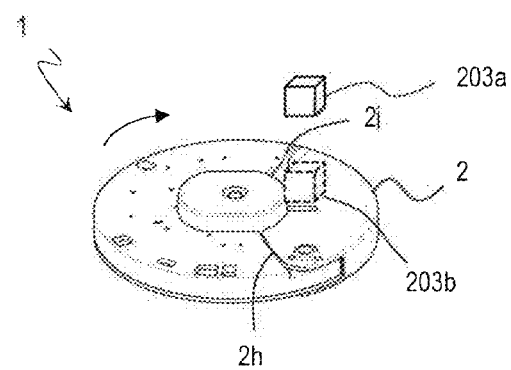
FIG. 1D is a schematic diagram describing a method of detecting an origin of a sample analysis substrate in the sample analysis device.

It may be so arranged that the sample analysis substrate 1 is attached to the turntable 202 at an arbitrary angle. In this case, the rotation angle of a portion of the sample analysis substrate 1 (attached to the turntable 202) to serve as a reference is detected. Hereinafter, the portion of the sample analysis substrate 1 to serve as a reference will be referred to as the origin. For this purpose, the sample analysis device 200 may include an origin detector 203. For example, as shown in FIG. 1D, the origin detector 203 includes a light source 203*a*, a photodetector 203*b*, and an origin detection circuit 203*c*, and is disposed so that the sample analysis substrate 1 comes between the light source 203*a* and the photodetector 203*b*. For example, the light source 203*a* may be a light-emitting diode, and the photodetector 203*b* may be a photodiode. As will be described later, the sample analysis substrate 1 has a protection cap 2 having a light shielding ability. The protection cap 2 has a light shielding ability to shade at least part of the light which exits the light source 203*a*, for example. The sample analysis substrate 1 has a small transmittance (e.g. 10% or less) in the region of the protection cap 2, and a large transmittance (e.g. 60% or more) in the region other than the marker 210.

As the sample analysis substrate 1 is rotated by the motor 201, the photodetector 203b outputs a detection signal which is in accordance with the amount of incident light to the origin detection circuit 203c. Depending on the direction of rotation, the detection signal may increase or decrease at an edge 2h and at an edge 2j of the protection cap 2. The origin detection circuit 203c detects a decrease in the amount of detected light and outputs it as an origin signal, for example, while the sample analysis substrate 1 is rotating clockwise as indicated by the arrow.

In the present specification, the position of the edge 2h of the protection cap 2 will be regarded as the origin position of the sample analysis substrate 1 (i.e., a reference angular position of the sample analysis substrate 1). However, a position at any specific angle, as arbitrarily determined from the position of the edge 2j of the protection cap 2, might be defined as an origin. In the case where the protection cap 2 has a sector shape, with a central angle being smaller than the precision of angle detection that is required for sample analysis, the protection cap 2 itself may be regarded as the origin position.

The origin position is utilized by the sample analysis device 200 in acquiring information on the rotation angle of the sample analysis substrate 1. The origin detector 203 may have any other configuration. For example, a magnet for use in origin detection may be provided on the sample analysis substrate 1, and the origin detector 203 may be a magnetism detector which detects magnetism of this magnet. Moreover, a magnet for use in capturing the magnetic particles, as described later, may also be utilized for origin detection.

the optical measurement unit 207 detects a signal which is in accordance with an analyte that is retained by the sample analysis substrate 1. As will be described later, the signal may be luminescence such as fluorescence, etc., which is emitted from an analyte that has reacted with a reagent, absorbance of transmitted light, or the like. For example, the optical measurement unit 207 may include a light source 207a, a photodetector 207b, and a detection circuit 207c, such that, on the basis of light which is emitted from light source 207a, the photodetector 207b detects fluorescence which is emitted from an analyte that has reacted with a reagent. An output of the photodetector 207b is input to the detection circuit 207c.

The control circuit 205 includes a CPU which is provided in the sample analysis device 200, for example. Based on an operator's instruction from the input device 209, the control circuit 205 operates various elements of the sample analysis device 200 to analyze the analyte. Specifically, by executing a computer program that is loaded into a RAM (Random Access Memory; not shown), the control circuit 205 sends instructions to other circuitry in accordance with the procedure defined by the computer program. Upon receiving such an instruction, each circuit operates as will be described in the present specification, whereby the function of the respective circuit is realized. The instructions from the control circuit 205 are sent to the origin detector 203, the rotation angle detection circuit 204, the drive circuit 206, the optical measurement unit 207, and the like. The procedure defined by the computer program is shown by a flowchart in the attached drawings.

Note that a RAM into which a computer program is loaded, i.e., a RAM storing a computer program, may be volatile or neo-volatile. A volatile RAM is a RAM which in the absence of supplied is unable to retain the information that is stored therein. For example, a dynamic random access memory (DRAM) is a typical volatile RAM. A non-volatile RAM is a RAM which is able to retain information without power being supplied thereto. For example, a magnetoresistive RAM (MRAM), a resistive random access memory (ReRAM), and a ferroelectric memory (FeRAM) are examples of non-volatile RAMs. In the present embodiment, a non-volatile RAM is preferably adopted.

A volatile RAM and a non-volatile RAM are both examples of non-transitory, computer-readable storage media. Moreover, a magnetic storage medium such as a hard disk, and an optical storage medium such as an optical disc are also examples of non-transitory, computer-readable storage media. That is, a computer program according to the present disclosure may be recorded on various non-transitory computer-readable media, excluding any medium such as the atmospheric air (transitory media) that allows a computer program to be propagated as a radiowave signal.

In the present specification, the control circuit 205 is described as a distinct component element from the rotation angle detection circuit 204 and the origin detection circuit 203c of the origin detector 203. However, these may be implemented by the same hardware. For example, in a serial or parallel manner, a CPU (computer) which is provided in the sample analysis device 200 may execute a computer program no function as the control circuit 205, a computer program to function as the rotation angle detection circuit 204, and a computer program to function as the origin detection circuit 203c of the origin detector 203. This allows the CPU to apparently operate as distinct component elements.

Sample Analysis Substrate 1

Figure 2A:
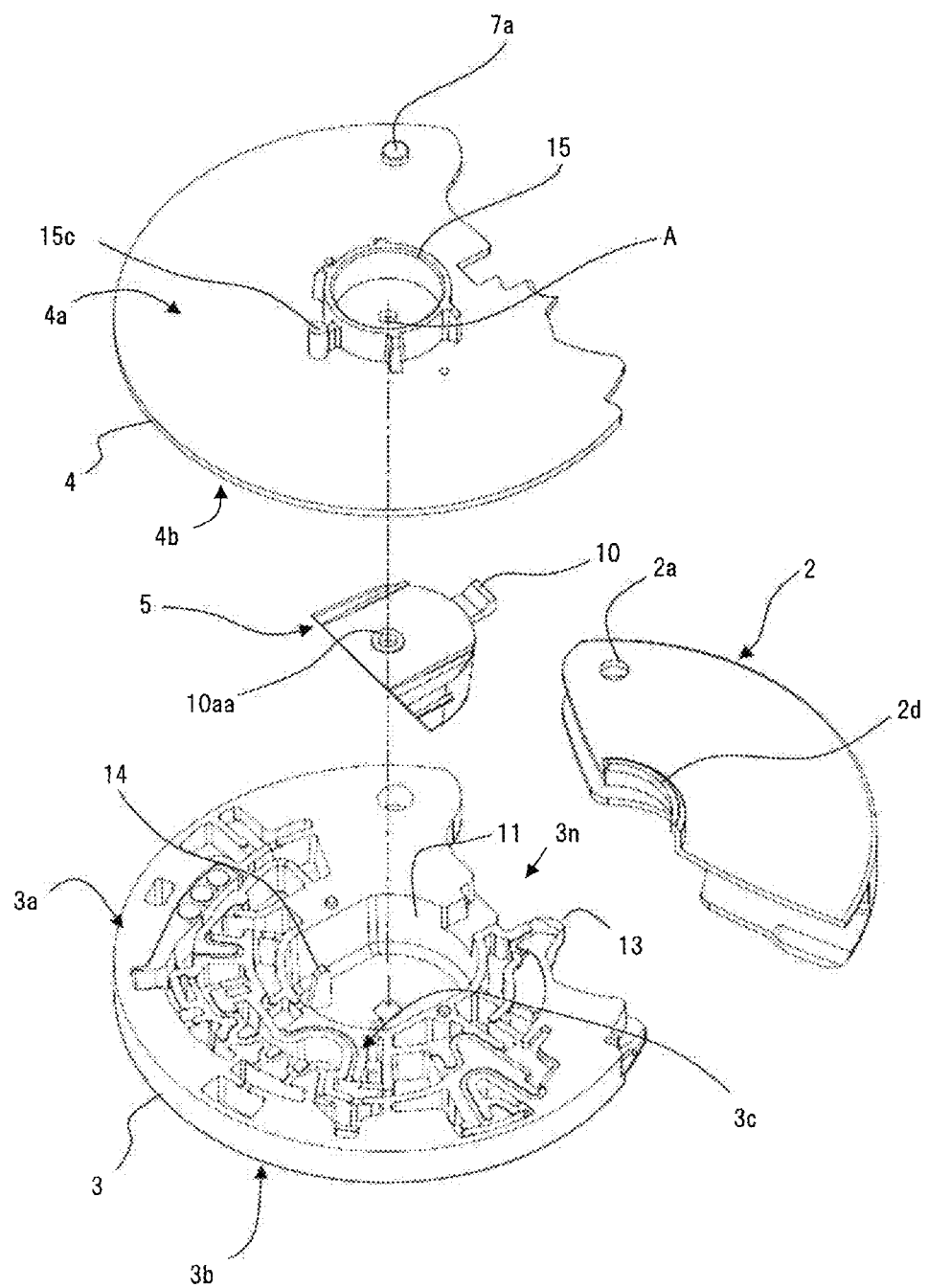
FIG. 2A is an exploded perspective view of the sample analysis substrate.

The structure of the sample analysis substrate will be described in detail. Through rotational motions, the sample analysis substrate permits transfer of a liquid introduced into the sample analysis substrate 1. FIG. 2A shows an exploded perspective view of the sample analysis substrate 1. In the present embodiment, the sample analysis substrate 1 includes a base substrate 3, a cover substrate 4, a protection cap 2, and a diluent container 5. A substrate body is constituted by the base substrate 3 and the cover substrate 4, such that, as a whole, the substrate body and the protection cap 2 constitute a single substrate.

The base substrate 3 has a first face 3a and a second face 3b, with a microchannel structure 3c being formed on the first face 3a. The microchannel structure 3c includes a plurality of chambers to retain minute amounts of fluid, and a plurality of channels through which fluid motions can occur between the plurality of chambers. The specific structure of the microchannel structure 3c will be described below. The first face 3a of the base substrate 3 further includes an accommodating section 11 for retaining the diluent container 5. Within the accommodating section 11, an unsealing rib 14, which is a protrusion, is provided. The base substrate 3 has a disk shape with a recessed portion 3n, and further includes an injection port 13 protruding from the recessed portion 3n. The injection port 13 is an opening through which to introduce a sample liquid containing an analyte into the microchannel structure 3c.

The cover substrate 4 is coupled to the base substrate 3 so that the first face 3a of the base substrate 3 is opposed to and abuts with a second face 4b of the cover substrate 4. As a result, any opening on the first face 3a of the microchannel structure 3c of the base substrate 3 is closed, whereby a plurality of partitioned chambers and channels are created in the substrate that is composed of the base substrate 3, the cover substrate 4, and the protection cap 2.

On a first face 4a of the cover substrate 4, a rotation support 15 to be inserted into the turntable 202 is provided. On the rotation support 15, a bump 15c is formed having a leading end which extends toward the outer periphery. The leading end of the bump 15c has a curved surface of a cylindrical shape that is parallel to the shaft A. The bump 15c functions as an engagement for preventing rotation, in order to restrain the sample analysis substrate 1 from slipping against the turntable 202 when the rotation support 15 is inserted in the turntable 202.

Figure 2B:
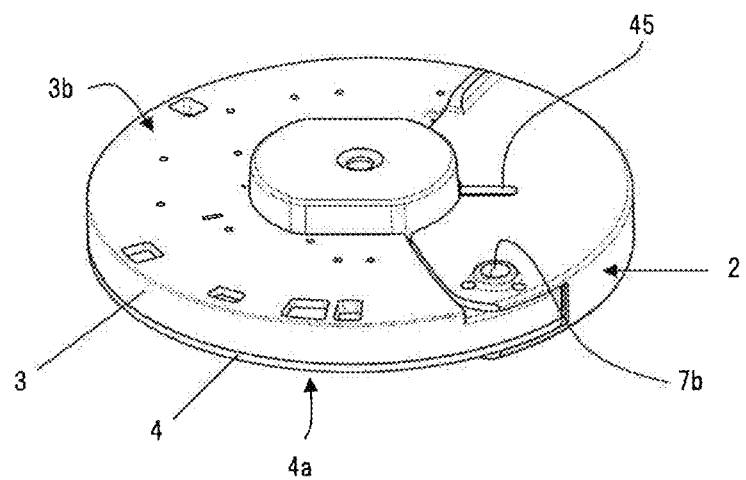
FIG. 2B is a perspective view of the sample analysis substrate where a protection cap is closed.
Figure 2C:
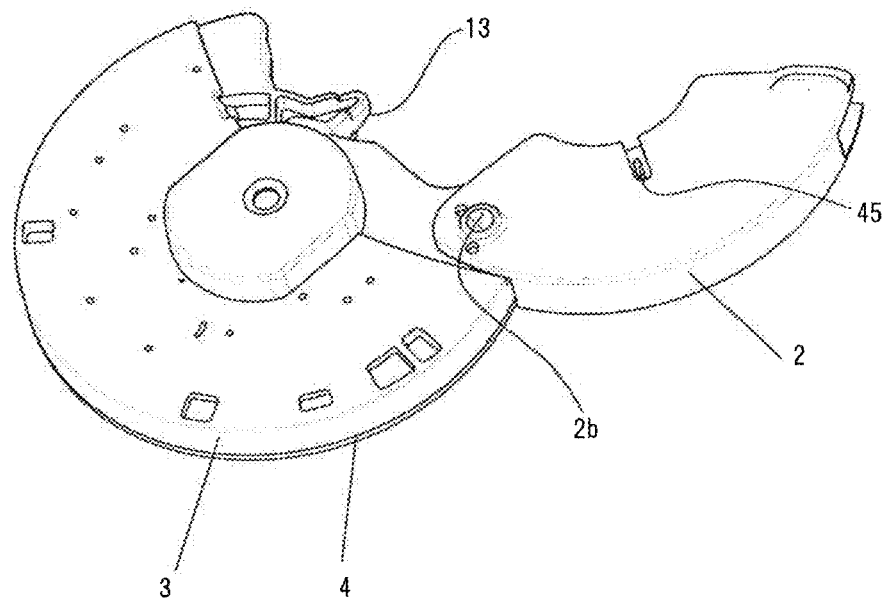
FIG. 2C is a perspective view of the sample analysis substrate where a protection cap is opened.

FIG. 2B and FIG. 2C are perspective views of the sample analysis substrate 1 when the protection cap 2 is closed and opened. The protection cap 2 has a sector shape covering the recessed portion 3n of the base substrate 3, with apertures 2a and 2b being at one end of the sector shape. On the first face 4a of the cover substrate 4 and on the second face 3b of the base substrate 3, respectively, bumps 7a and 7b are present near the recess 3n; as the bumps 7a and 7b are inserted in the apertures 2a and 2b of the protection cap 2, the protection cap 2 is pivotally supported with respect to the substrate body.

As shown in FIG. 2C, when the protection cap 2 is open, the injection port 13 becomes exposed, thus allowing a sample liquid to be introduced through the injection port 13. As shown in FIG. 2B, when the protection cap 2 is closed, the injection port 13 is covered by the protection cap 2. As a result of this, when a sample liquid has been introduced through the injection port 13 and the sample analysis substrate 1 has been rotated, the sample liquid is restrained from scattering through the injection port 13 due to the centrifugal force associated with rotation.

The protection cap 2 also has the function of retaining the diluent container 5 at a predetermined position before measurement, and unsealing the diluent container 5 at measurement. These functions will be explained while specifically describing the structure of the protection cap 2 and the diluent container 5.

Figure 3A:
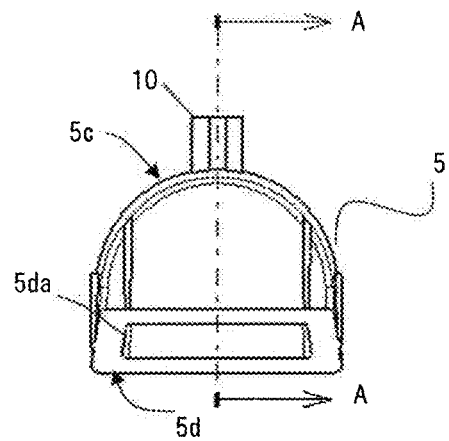
FIG. 3A is a plan view of a diluent container.
Figure 3B:
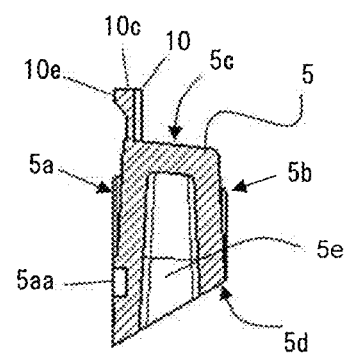
FIG. 3B is an A-A cross-sectional view in FIG. 3A of the diluent container.
Figure 3C:
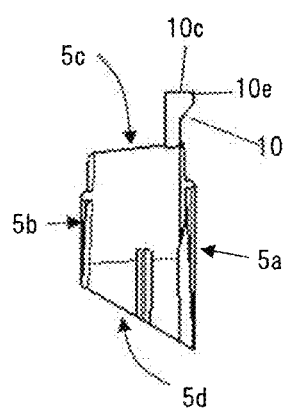
FIG. 3C is a side view of the diluent container.
Figure 3D:
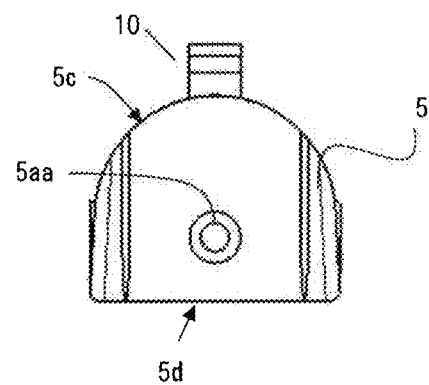
FIG. 3D is a rear view of the diluent container.
Figure 3E:
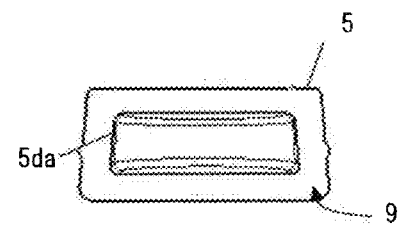
FIG. 3E is a front view of the diluent container.
Figure 4A:
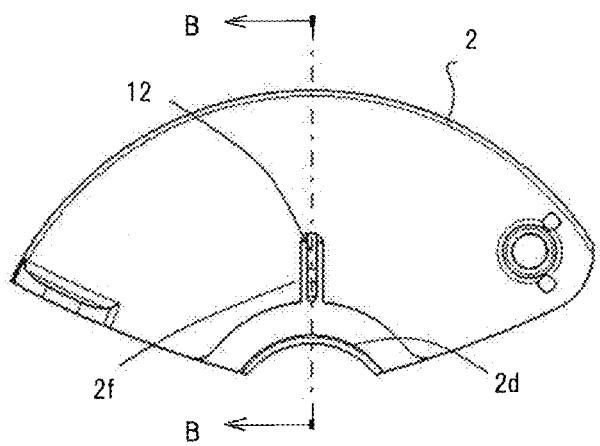
FIG. 4A is a plan view of the protection cap.
Figure 4B:
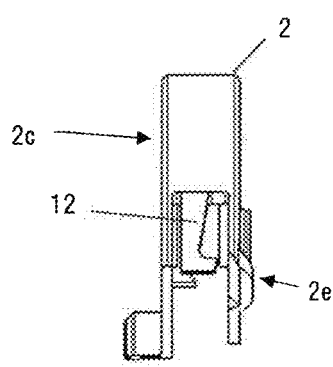
FIG. 4B is a side view of the protection cap.
Figure 4C:
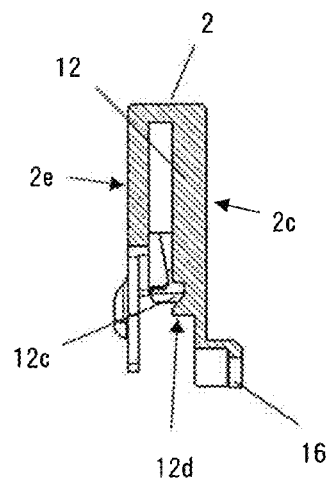
FIG. 4C is a B-B cross-sectional view in FIG. 4A of the protection cap.
Figure 4D:
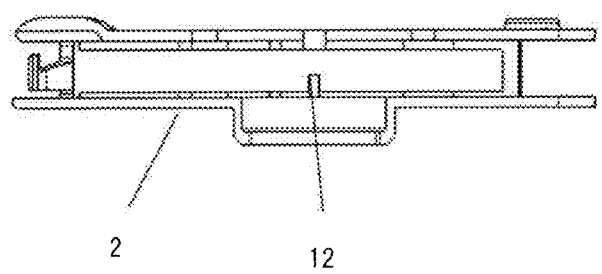
FIG. 4D is a rear view of the protection cap.

FIG. 3A through FIG. 3E are a plan view, an A-A cross-sectional view in FIG. 3A, a side view, a rear view, and a front view of the diluent container 5. FIG. 4A through FIG. 4D are a plan view, a side view, a B-B cross-sectional view in FIG. 4A, and a rear view of the protection cap 2.

The diluent container 5 includes: a first face 5a and a second face 5b; a curved surface 5c and a side face 5d being located between the first face 5a and the second face 5b and corresponding to the space of the accommodating section 11 of the substrate body; and an accommodating space 5e. The accommodating space 5e has an opening 5da in the side face 5d. A diluent 8 is retained in the accommodating space 5e, and a sealing member 9 is coupled to the side face 5d so as to cover the opening 5da. The sealing member is composed of a resin, an aluminum foil, or a composite thereof, etc., for example. The side face 5d is inclined toward the second face 5b. A latching portion 10, having an abutting face 10c and a bump 10e, is connected to the curved surface 5c. A recess 5aa is made in the first face 5a.

The protection cap 2 includes a protruding portion 12, which has a notch 12c and an abutting face 12d and which is provided inside a second face 2e. Moreover, it has a side face 2d on the sector-shaped inner periphery of the first face 2c.

Figure 5A:
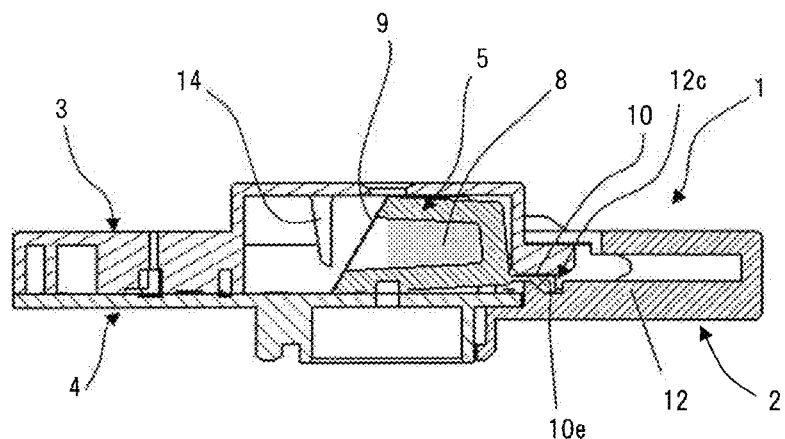
FIG. 5A is a cross-sectional view showing a pre-use state of a sample analysis substrate.
Figure 5B:
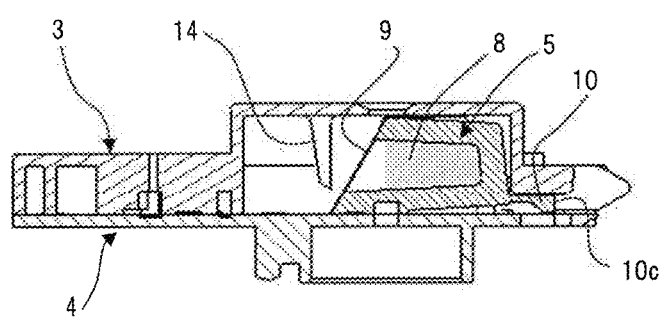
FIG. 5B is a cross-sectional view of the sample analysis substrate showing a state where a sample liquid is to be introduced.
Figure 5C:
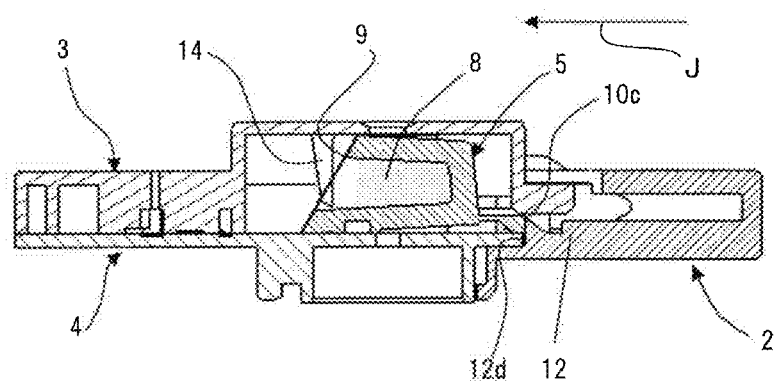
FIG. 5C is a cross-sectional view of the sample analysis substrate showing a state where the protection cap is closed.

FIG. 5A through FIG. 5C are cross-sectional views showing a pre-use state of the sample analysis substrate 1, a state where a sample liquid is to be introduced, and a state where the protection cap is closed. As shown in FIG. 5A, in a pre-use state, the protection cap 2 is closed, and the bump 10e of the latching portion 10 of the diluent container 5 is engaged with the notch 12c of the protruding portion 12 of the protection cap 2. Therefore, the diluent container 5 is fixed by the protection cap 2 so as not to move in the direction of arrow J. The sample analysis substrate 1 is provided to the user in this state. In the accommodating section 11, in this state, the diluent container 5 is placed in an initial position where the unsealing rib 14 is spaced apart from the sealing member 9.

A user wanting to perform analysis of an analyte opens the protection cap 2, as shown in FIG. 5A and FIG. 5B. As a result, the latching portion 10 of the diluent container 5 undergoes elastic deformation, so that the bump 10e becomes detached from the notch 12c of the protruding portion 12 of the protection cap 2, whereby engagement between the latching portion 10 and the protruding portion 12 is released.

In this state, the user applies dropwise the sample liquid in the exposed in port 13 of the sample analysis substrate 1, and closes the protection cap 2 as shown in FIG. 5B and FIG. 5C. At this time, closing the protection cap 2 causes the abutting face 12d of the protruding portion 12 of the protection cap 2 to abut with the abutting face 10c of the latching portion 10 of the diluent container 5, so that the diluent container 5 moves in the J direction within the accommodating section 11 of the substrate body. As a result, the diluent container 5 moves to the unsealing position within the accommodating section 11.

As the diluent container 5 moves to the unsealing position, the sealing member 9 provided on the inclined side face 5d abuts with the unsealing rib 14, consecutively from its leading end to its root, whereby the sealing member 9 becomes unsealed by the unsealing rib 14. As a result, the diluent which was retained in the accommodating space 5e becomes ready to be discharged out of the diluent container 5. In this state, a portion of the diluent may be discharged from the diluent container 5.

Figure 6:
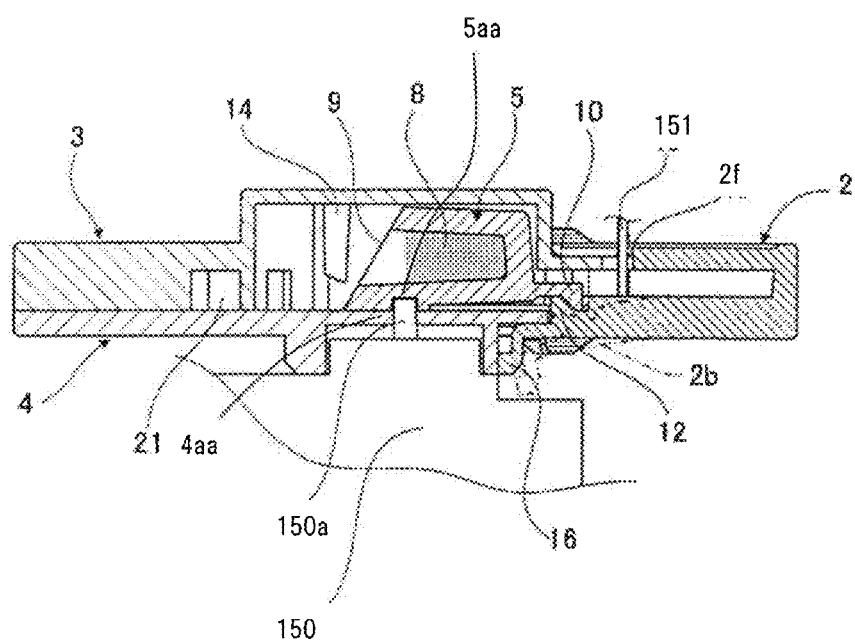
FIG. 6 shows a manufacturing step where the sample analysis substrate is set in the state shown in FIG. 5A.

FIG. 6 shows a manufacturing step where the sample analysis substrate 1 is set in the state shown in FIG. 5A. First, before closing the protection cap 2, the recess 5aa made in the lower face of the diluent container 5 and an aperture 4aa made in the cover substrate 4 are aligned, and in this initial position a protrusion 150a of a fixation jig 150 is engaged with the recess 5aa of the diluent container 5 through the aperture 4aa, thus setting the diluent container 5 in a state of being kept in the initial position. Then, the protection cap 2 is closed while, from a notch 2f made in an upper face of the protection cap 2 (see FIG. 4A), a pressurization jig 151 is inserted to press on the bottom race of the protection cap 2 so as to undergo elastic deformation; thereafter, the pressurization jig 151 is released, whereby the state of FIG. 5A is set.

Although this embodiment illustrates an example where the recess 5aa is made in the first face 5a of the diluent container 5, a recess may be made in the second face 5b of the diluent container 5, and an aperture corresponding to this recess may be made in the base substrate 3 to allow the protrusion 150a of the fixation jig 150 to be engaged into the recess.

Although the present embodiment illustrates that the notch 12c of the protection cap 2 directly engages with the latching portion 10 of the diluent container 5 to fix the diluent container 5 in the position, the notch 12c of the protection cap 2 and the latching portion 10 of the diluent container 5 may be allowed to indirectly engage to fix the diluent container 5 in the initial position.

Figure 7A:
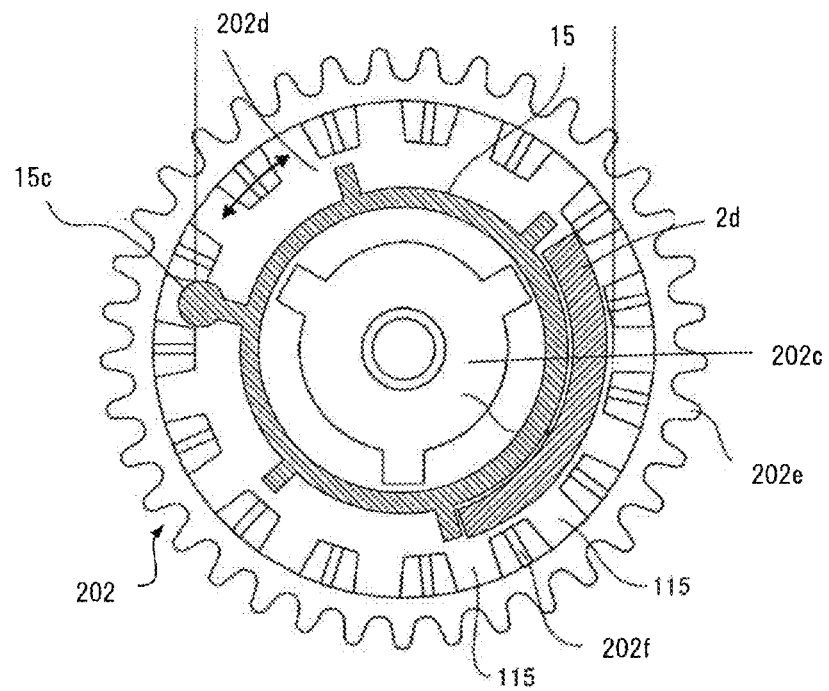
FIG. 7A is a top view of a turntable.
Figure 7B:
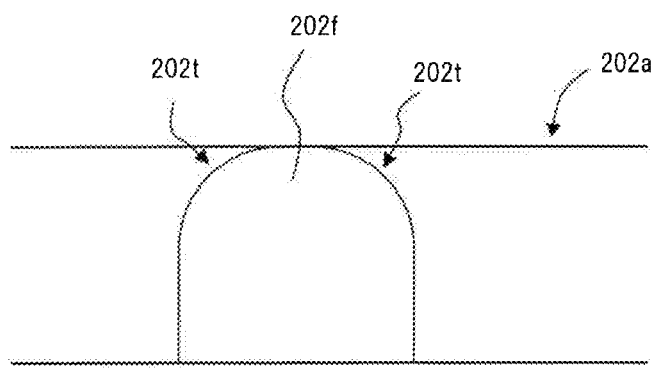
FIG. 7B shows a cross section of a tooth of a gear of the turntable along a circumferential direction.

Next, fixation of the sample analysis substrate 1 onto the turntable 202 will be described. FIG. 7A is a top view of the turntable 202. The turntable 202 includes a recess 202d having a cylindrical shape and a center bump 202c disposed in the recess 202d. Moreover, the turntable 202 includes a gear 202f located on its outer side face and a gear 202f provided on a side face of the recess 202d. FIG. 7B shows a cross section of a tooth of the gear 202f along a circumferential direction. Each tooth of the gear 202f includes tapers 202t at corners closer to the upper face 202a of the turntable.

When the sample analysis substrate 1 is mounted on the turntable 202, the rotation support 15 of the sample analysis substrate 1 is inserted in a space between the recess 202d and the center bump 202c of the turntable 202. In FIG. 7A, the rotation support 15 to be inserted is shown hatched.

The center bump 202c of the turntable 202 is inserted into the space within the rotation support 15 of the sample analysis substrate 1. The rotation support 15 and the side face 2d of the protection cap 2 are inserted in a space in the recess 202d of the turntable 202 between the center bump 202c and the gear 202f. At this time, the side face 2d abuts with a face of the gear 202f at its leading end. The leading end of the bump 15c of the rotation support 15 is inserted. In one of the grooves of the gear 202f. Since the side face 2d abuts with the leading end of the gear 202f, insertion into the recess 202d of the turntable 202 is possible irrespective of the rotation angular position of the turntable 202. On the other hand, the leading end of the bump 15c cannot be inserted in the recess 202d at an angle where it abuts with a tooth of the gear 202f. However, as shown in FIG. 7B, the tapers 202t are provided on each tooth of the gear 202f at its side closer to the upper face 202a; therefore, when the leading end of the bump 15c abuts with the taper 202t of a tooth, a taper 202t receives a drag force alone the circumferential direction from the leading end of the bump 15c, whereby the turntable 202 rotates slightly. As a result of this, the leading end of the bump 105c is inserted in a groove of the gear 202f. Thus, in a state where the rotation support 15 of the sample analysis substrate 1 and the gear 202f of the turntable 202 mesh together and do not slip, the sample analysis substrate 1 is mounted on the turntable 202.

Since the leading end of the bump 15c Is insertable to any groove of the gear 202f, an operator can mount the sample analysis substrate 1 onto the turntable 202 without paying attention to the angle of attaching the sample analysis substrate 1. Moreover, the side face 2d abuts with the leading ends of the plurality of teeth of the gear 202f. Therefore, by means of the bump 15c and the side face 2d, the rotation support 15 is able to come in contact with the gear 202f of the turntable 202 at a plurality of places of relatively small geometric areas, whereby the turntable 202 is able to support the rotation support 15 without wobbling.

As described above, the rotation axis of the turntable 202 is tilted by an angle θ from the direction of gravity. This allows the direction of gravity acting on the solution in the sample analysis substrate 1 to be controlled in accordance with the rotation stop position of the sample analysis substrate 1.

Figure 8A:
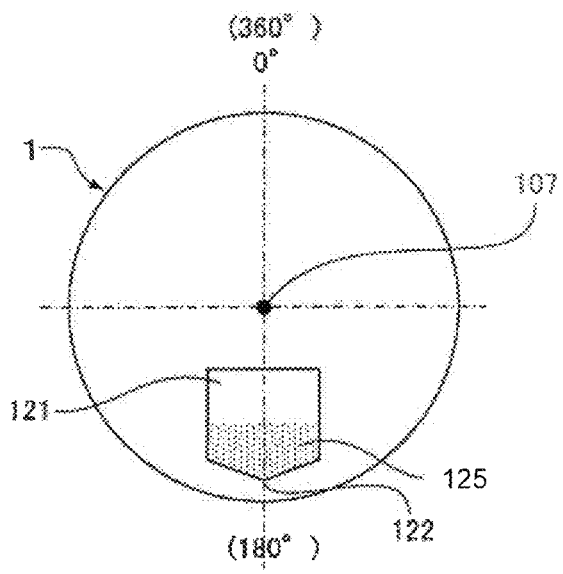
FIG. 8A is a schematic diagram describing transfer of a liquid in the sample analysis substrate, which is based on gravity.

For example, when the sample analysis substrate 1 is stopped at a position depicted in FIG. 8A (i.e., a position near 180° based on the zenithal direction being defined as 0° (360°)), the outer side face 122 of the chamber 121 faces downwards as viewed from the front, and therefore gravity acts on the solution 125 in the chamber 121 toward the outer periphery (outer side face 122).

Figure 8B:
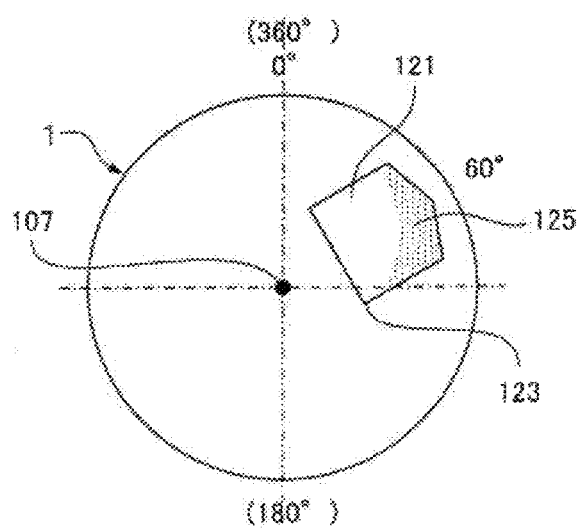
FIG. 8B is a schematic diagram describing transfer of a liquid in the sample analysis substrate, which is based on gravity.
Figure 8C:
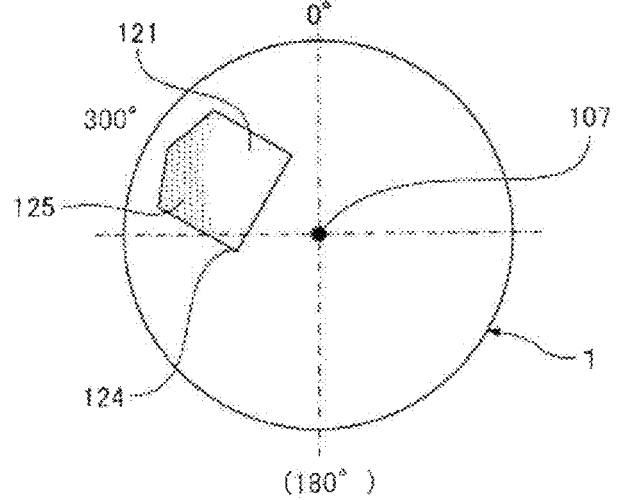
FIG. 8C is a schematic diagram describing transfer of a liquid in the sample analysis substrate, which is based on gravity.

On the other hand, when the sample analysis substrate 1 is stopped at a position near 60° as depicted in FIG. 8B, the left side face 123 of the chamber 121 faces downwards as viewed from the front, and therefore gravity acts on the solution 125 in the chamber 121 toward the left side face 123. Similarly, at a position near 300° as depicted in FIG. 8C, the right side face 124 of the chamber 121 faces downwards as viewed from the front, and therefore gravity acts on the solution 125 in the chamber 121 toward the right side face 124.

Thus, by conferring inclination to the shaft A and stopping the sample analysis substrate 1 at any arbitrary rotation stop position, gravity can be utilized as a motive force for transferring the solution in the sample analysis substrate 1 in a predetermined direction.

The magnitude of gravity acting on the solution in the sample analysis substrate 1 can be set by adjusting the angle θ of the shaft A, and is desirably set based on a relationship between the amount of liquid to be transferred and the force of adhering to the wall surface within the sample analysis substrate 1.

It is desirable that the angle θ is in the range from 10° to 45°. If the angle θ is smaller than 10°, the gravity acting on the solution will be too small to obtain the motive force needed for transfer; if the angle θ is greater than 45°, the load on the shaft A may increase, or the solution having been transferred by centrifugal force may move uninhibitedly because of its own weight, thus making control difficult.

As the materials of the parts composing the sample analysis substrate 1, resin materials are desirable, because of low material cost and good mass producibility. Since the analysis device 200 analyzes the sample liquid by an optical measurement method which measures light that is transmitted through the sample analysis substrate 1, synthetic resins which are highly light-transmissive (transparent), e.g., PC, PMMA, AS, and MS, are desirable as the materials of the base substrate 3 and the cover substrate 4.

As the material of the diluent container 5, synthetic resins which have low moisture permeability and which are crystalline, e.g., PP and PE, are desirable because the diluent 8 needs to be kept sealed in the interior of the diluent container 5 for long periods of time. Without particularity, the material of the protection cap 2 may be any material having good formability, while inexpensive resins such as PP, PE, and ABS would be desirable.

Coupling between the base substrate 3 and the cover substrate 4 may desirably be based on a method which is not likely to affect the reaction activity of the reagent carried in the accommodating area, and ultrasonic welding, laser welding, etc., which are not likely to generate any reactive gases or solvents during coupling, are desirable.

Moreover, within the microchannel structure that is formed by coupling of the base substrate 3 and the cover substrate 4, portions in which a solution is transferred by capillary force, e.g., channels, are desirably subjected to a hydrophilic treatment for enhancing capillary force. Specifically, they have been subjected to a hydrophilic treatment using a hydrophilic polymer, a surfactant, or the like. Herein, hydrophilicity is defined by an angle of contact with water being less than 90°, and more desirably, such an angle of contact is less than 40°.

Figure 9A:
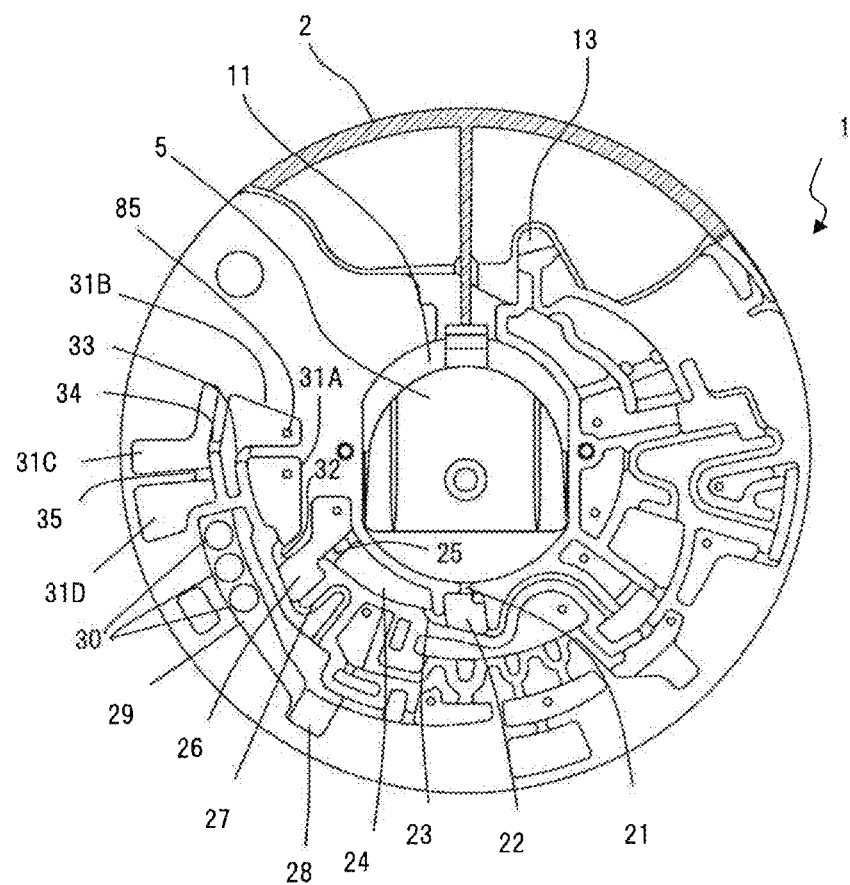
FIG. 9A is a plan view describing a microchannel structure of the sample analysis substrate.

Next, the microchannel structure to be formed on the sample analysis substrate 1 will be described. In the sample analysis system according to the present embodiment, a reagent for detecting an analyte that is contained in sample liquid is allowed to react with the analyte in a solution state. As a result, uniformity of the reaction between the analyte and the reagent can be enhanced, and the accuracy of analyte detection or measurement of the analyte amount can be enhanced. Therefore, as shown in FIG. 9A, the substrate of the sample analysis substrate 1 includes a retention chamber (second retention chamber) 22, an overflow chamber 24, a retention chamber (first retention chamber) 26, a measurement chamber 28, a reagent chamber 29, and overflow chambers 31A through 31D. Moreover, the substrate of the sample analysis substrate 1 includes a channel 21 connecting the accommodating section 11 and the retention chamber 22, a channel 23 connecting the retention chamber 22 and the overflow chamber 24, a channel 25 connecting the overflow chamber 24 and the retention chamber 26, and a channel 27 connecting the retention chamber 26 and the measurement chamber 28. Furthermore, the substrate of the sample analysis substrate 1 includes a channel 32 connecting the retention chamber 26 and the overflow chamber 31A, a channel connecting the overflow chamber 31A and the overflow chamber 31B, a channel 34 connecting the overflow chamber 31B and the overflow chamber 31C, and a channel 35 connecting the overflow chamber 31C and the overflow chamber 31D. The channel 27 connects between the retention chamber 26 and the measurement chamber 28 or reagent chamber 29, thus constituting a first diluent path through which a diluent is transferred. The connection port of the channel 27 with the retention chamber 26 is located closer to the inner peripheral side than is its connection port with the measurement chamber 28 or reagent chamber 29. Moreover, between these connection ports, the channel 27 includes a convex portion which protrudes closer to the inner peripheral than are these two connection ports. In other words, the channel 27 constitutes a siphon, where the centrifugal force acting when the sample analysis substrate 1 is rotated is to be regarded as if gravity.

Figure 9B:
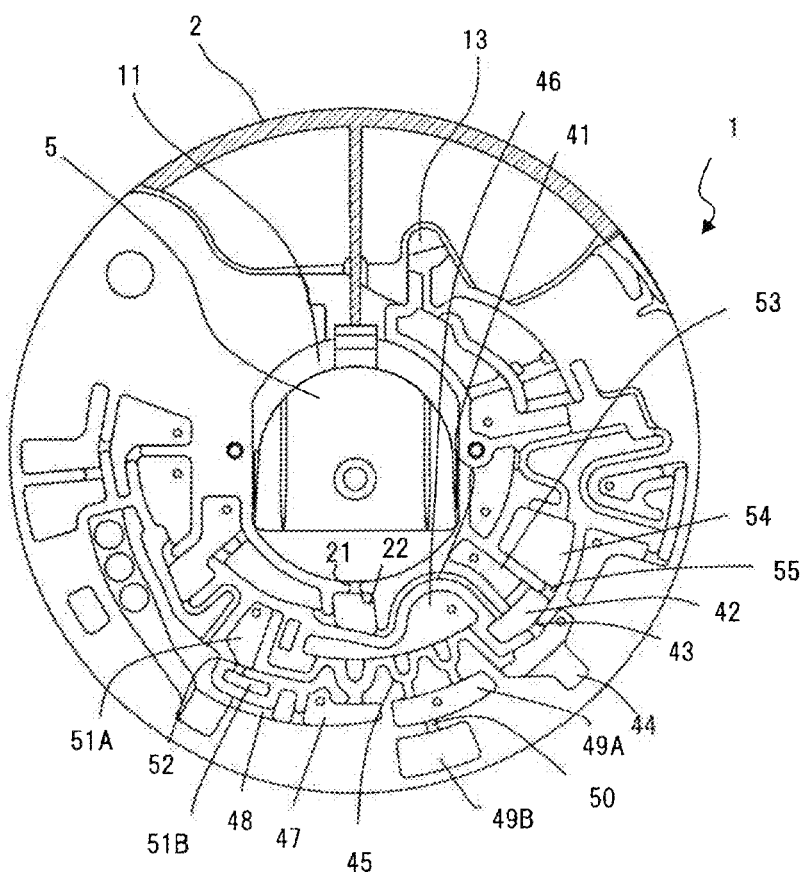
FIG. 9B is a plan view describing a microchannel structure of the sample analysis substrate

Preferably, the analyte or the sample liquid containing the analyte is also diluted with the diluent. Therefore, as shown in FIG. 9B, the substrate of the sample analysis substrate 1 includes: a chamber 42; a mixing chamber 44; a channel 41 connecting the retention chamber 22 and the chamber 42; and a channel 43 connecting the chamber 42 and the mixing chamber 44. In the mixing chamber 44, the sample liquid containing the analyte described later is mixed with the diluent. The analyte having been diluted with the diluent is transferred to the measurement chamber 28. For this purpose, the sample analysis substrate 1 includes: an air exposure chamber 47; a channel 45 connecting the mixing chamber 44 and the air exposure chamber 47; a channel 48 connecting the air exposure chamber 47 and the measurement chamber 28; and an air exposure chamber 46 connected to the channel 45. The channel 41, the chamber 42, and the channel 43 constitute a second diluent path connecting the retention chamber 22 and the mixing chamber 44. Moreover, the channel 45, the air exposure chamber 47, and the channel 48 constitute a mixed solution path connecting the mixing chamber 44 and the measurement chamber 28.

Figure 9C:
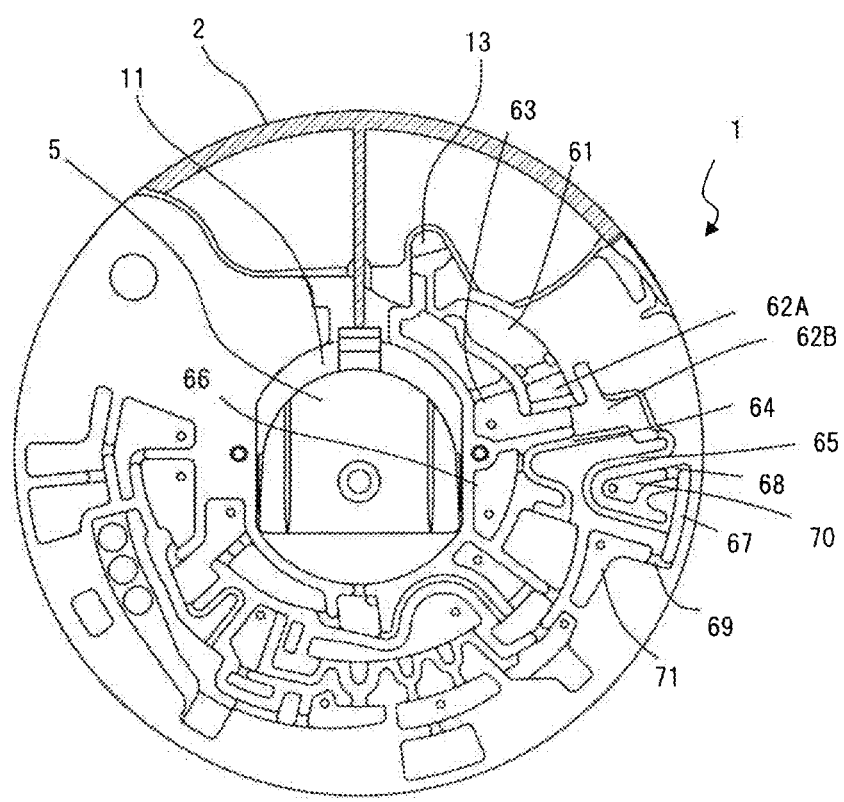
FIG. 9C is a plan view describing a microchannel structure of the sample analysis substrate

As shown in FIG. 9C, in order to remove some components from the sample liquid, the sample analysis substrate 1 includes: analyte chambers 62A and 62B; an overflow chamber 67; a channel 64, a chamber 54, and a channel 55 connecting the analyte chamber 62 and the chamber 42; channels 68 and 69 connected to the overflow chamber 67; air exposure chambers 70 and 71 connected to the channels 68 and 69; and an air exposure chamber 66 connected to the channel 64.

The channel 64, the chamber 54, the channel 55, the chamber 42, and the channel 43 constitute an analyte path connecting the analyte chamber 62B and the mixing chamber 44.

Each channel has a width of 0.5 mm to 2 mm and a depth of 50 µm to 500 µm. This sire defines a range in which capillary force can act in the case where the sample liquid is blood, for example.

In each air exposure chamber, an air hole 85 is respectively made. Also, an air hole 85 is made in the retention chamber 26, the overflow chambers 31A, 31B, 49A and 51A, and the mixing chamber 44. The air holes 85 are depicted as small circles in the figures, and for ease of understanding are not indicated by any reference numeral.

In the present embodiment, each channel has a shape for allowing capillary force to act, such that, when the inlet of each channel is in contact with a liquid while the sample analysis substrate 1 is not rotated, a part or a whole of each channel is filled with that liquid owing to capillary force. Regarding each channel, in accordance with the direction in which a liquid such as the diluent 8 or the sample liquid flows, the upstream one of the two openings of the channel is referred to as the inlet, and the downstream opening as the outlet.

In the case where the channel has a siphon shape, with respect to the shaft A of the sample analysis substrate 1, the inlet is located closer to the inner peripheral side than is the outlet, and each channel includes a bent portion which bends at the inner peripheral side of the surface of a liquid retained in a chamber to which the inlet of the channel is connected.

Hereinafter, with reference to the drawings, a measurement method of an analyte by the sample analysis system will be described in detail. The present embodiment will illustrate an example where a component such as HbA1c contained in a plasma component of human blood is detected as an analyte, and the amount of analyte is measured.

(1) Introduction of the Sample Liquid into the Sample Analysis Substrate 1

Figure 10A:
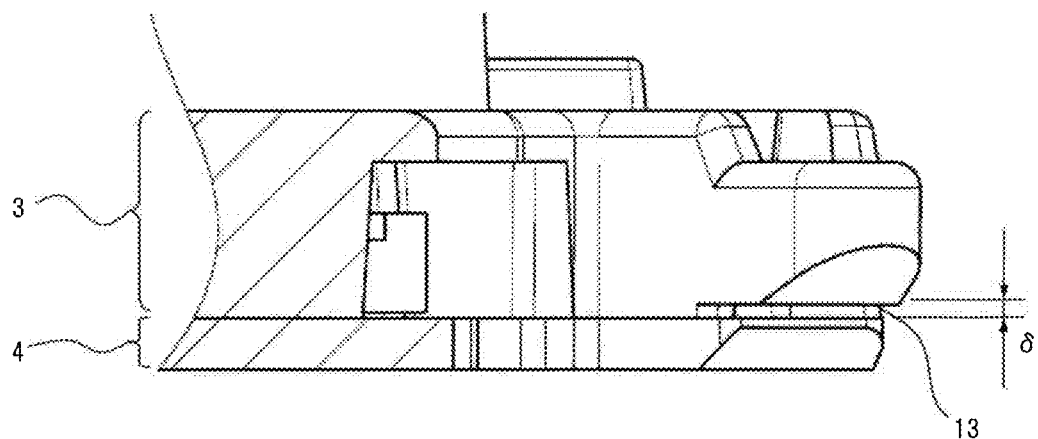
FIG. 10A shows enlarged view of an injection port of the sample analysis substrate as seen from outside of the sample analysis substrate.
Figure 10B:
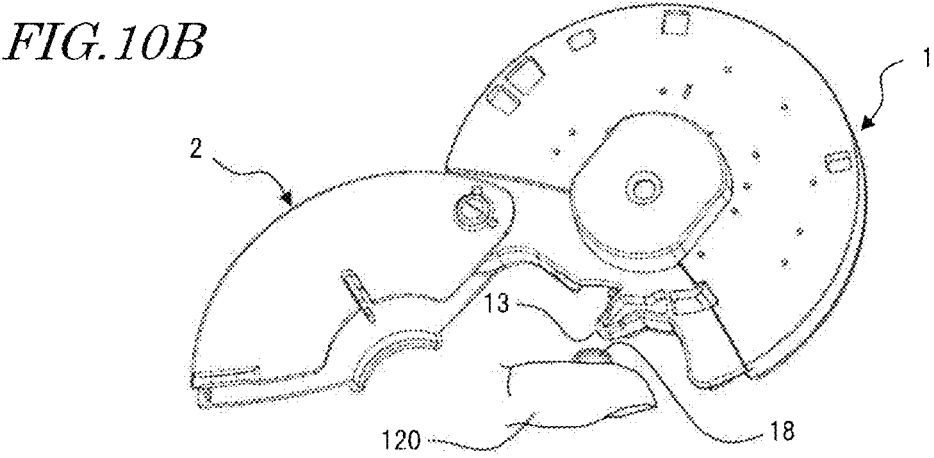
FIG. 10B shows how a sample liquid may be collected from a fingertip by opening the protection cap.
Figure 10C:
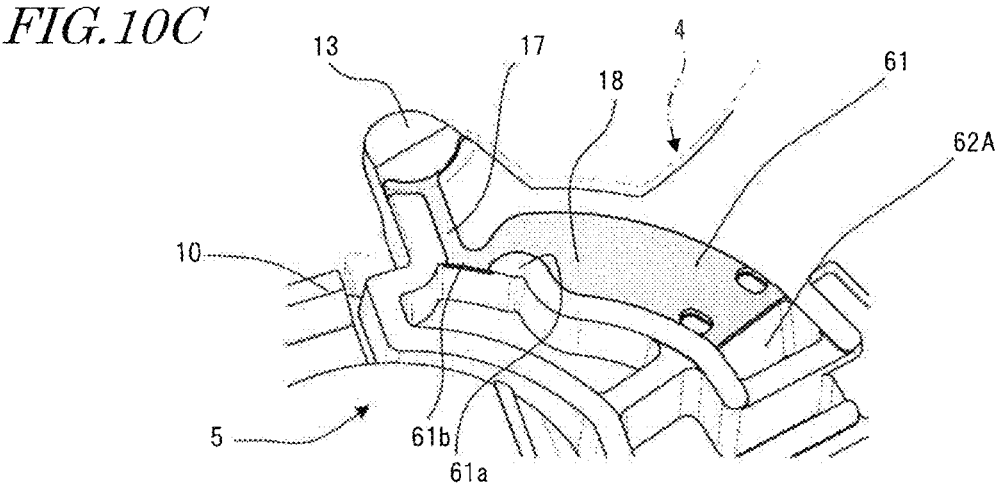
FIG. 10C as a perspective view showing a structure near the injection port as seen from the turntable side.

First, a sample liquid containing the analyte for detection is introduced into the sample analysis substrate 1. FIG. 10A shows an enlarged view where the injection port 13 of the sample analysis substrate 1 is seen from outside of the sample analysis substrate 1; FIG. 10B shows how a sample liquid 18 may be collected from a fingertip 120 by opening the protection cap 2; and FIG. 10C is a perspective view showing a structure near the injection port as seen from the turntable 202 side.

The injection port 13 is shaped so as to protrude from the shaft A, which, is set in the interior of the sample analysis substrate 1 toward the outer periphery, and, via an introductory section 17 which is subject to the capillary force in a minute gap δ that is formed between the base substrate 3 and the cover substrate 4 and extends toward the inner periphery, is connected to the inlet of the channel 61, which is able to retain a necessary amount based on capillary force. Therefore, by opening the protection cap 2 and directly applying the sample liquid (blood) 18 to the injection port 13, the sample liquid 18 adhering near the injection port 13 is taken into the interior of the sample analysis substrate 1 because of the capillary force of the introductory section 17.

At the interconnection between the introductory section 17 and the channel 61, i.e., the inlet of the channel 61, a bent portion 61b is formed, which creates a recess 61a in the base substrate 3 for changing the orientation of the channel. The bent portion 61b protrudes toward the inner peripheral sine of the sample analysis substrate 1. The outlet of the channel 61 is connected to the analyte chamber 62A.

(2) Mounting of the Sample Analysis Substrate 1 to the Sample Analysis Device 200

After the sample liquid is introduced in the sample analysis substrate 1, the protection cap 2 is closed. As described earlier, this causes the diluent container 5 to move in the accommodating section 11, so that the unsealing rib 14 unseals the sealing member 9. As a result, the diluent becomes ready to be discharged through the opening of the sealing member 9.

As described above, the power switch 252 of the sample analysis device 200 is turned ON. The door 251 of the sample analysis device 200 is opened; the rotation support 15 of the sample analysis substrate 1 is inserted in the recess 202d of the turntable; and the sample analysis substrate 1 is mounted on the turntable 202. Thereafter, the door 251 is closed.

Figure 11A:
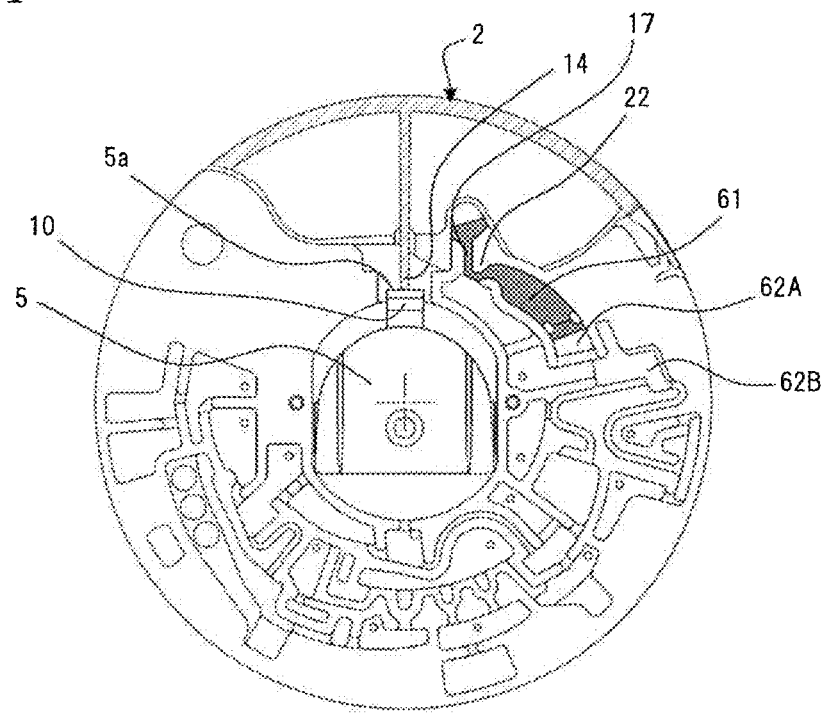
FIG. 11A is a diagram showing the positioning of a limpid in a sample analysis substrate during operation of the sample analysis system.

FIG. 11A shows the positions of the sample liquid 18 and the diluent 8 in the sample analysis substrate 1 in this state. The sample liquid 18 is situated in the channel 61. The diluent 8 remains retained in the diluent container 5; however, as described above, the diluent 8 is ready to be discharged because an opening is made in the sealing member 9.

Figure 11B:
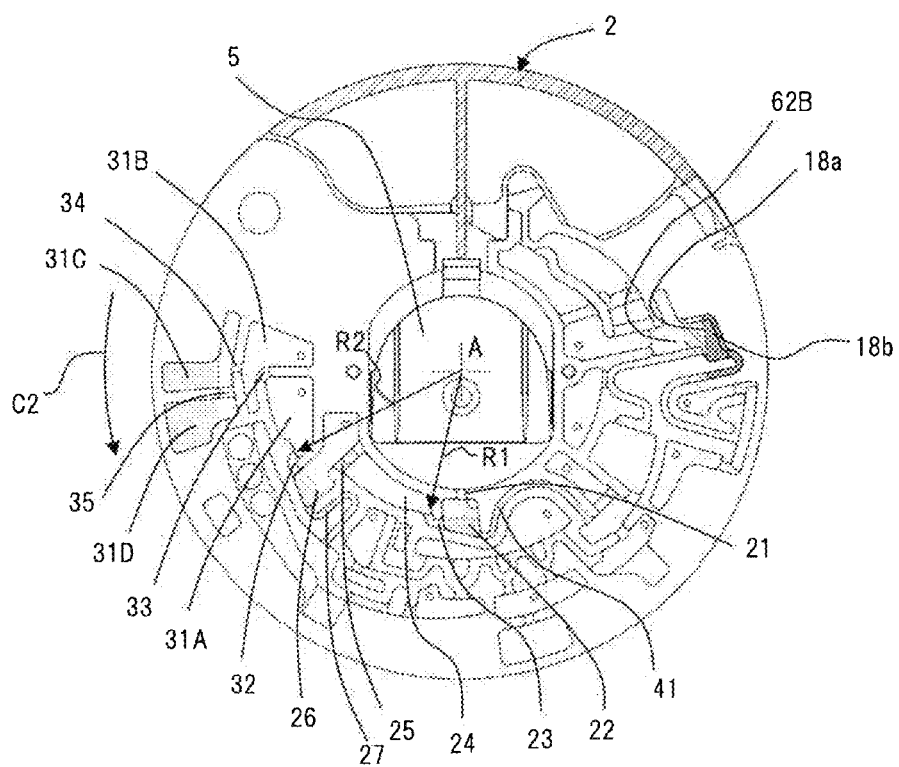
FIG. 11B is a diagram showing the positioning of a liquid in a sample analysis substrate during operation then of sample analysis system.

(3) Starting the Measurement, Moving the Diluent 8 to the Retention Chambers, and Moving the Sample Liquid to the Analyte Chambers As the operator commands a measurement to be started via the input device 209, the turntable 202 rotates, and as shown in FIG. 11B, the sample analysis substrate 1 rotates clockwise (C2 direction), for example. As a result, the sample liquid 18 in the channel 61 receives centrifugal force and becomes disrupted at the position of the bent portion 61b, whereby any sample liquid 18 that is situated closer to the outlet than is the bent portion 61b moves to the analyte chamber 62A. On the other hand, any sample liquid 18 that is situated closer to the inlet than is the bent portion 61b is discharged from the injection port 13 into the protection cap 2.

The sample liquid 18 which has moved to the analyte chamber 62A is further moved by centrifugal force to the analyte chamber 62B, which is located closer to the outer peripheral side than is the analyte chamber 62A. In the analyte chamber 62B, the sample liquid 18 is separated into a plasma component 18a and a corpuscle component 18b through centrifugal separation. Since the inlet of the channel 65 is connected at the outermost peripheral position of the analyte chamber 62B, a part of the channel 65 becomes filled with the corpuscle component 18b in this state. The inlet of the channel 64 is located closer to the inner peripheral side than is the outermost peripheral portion of the analyte chamber 62B, and is in contact with the plasma component 18a and the corpuscle component 18b. However, since the plasma component 18a is lower in viscosity than the corpuscle component 18b, the plasma component 18a is sucked to the channel 64 with higher priority, and a part of the channel 64 becomes filled with the plasma component 18a.

On the other hand, the diluent 8 in the diluent container 5 is discharged through the opening of the sealing member 9 into the accommodating section 11. Furthermore, as shown in FIG. 11B, the diluent 8 flows into the retention chamber 22 via the channel 21. If the diluent 8 having flown into the retention chamber 22 exceeds a predetermined amount, the diluent 8 beyond the predetermined amount flows into the retention chamber 26, via the channel 23, the overflow chamber 24, and the channel 25.

Since the inlet of the channel 25 connected to the overflow chamber 24 is located closer to the outer peripheral side than is the outlet of the channel 23 connected to the overflow chamber 24, the diluent 8 having flown into the overflow chamber 24 does not stay in the overflow chamber 24, but moves to the retention chamber 26 via the channel 25.

Figure 12:
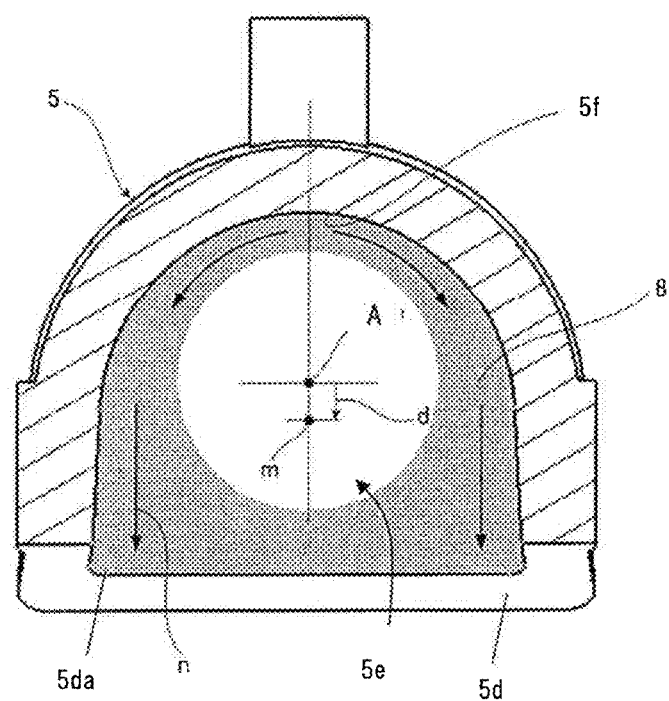
FIG. 12 is a diagram describing movement of a diluent within the diluent container.

Herein, as shown in FIG. 12, the inner wall 5f of the accommodating space 5e of the diluent container 5 is composed of a cylindrical surface which is located on the opposite side to the side face 5d and which has an axis m that is offset by d from the shaft A toward the opening 5da. As a result, through rotation of the sample analysis substrate 1, any diluent 8 that is situated on the inner wall 5f side of the shaft A is subject to a centrifugal force in a direction toward the inner wall 5f, but the diluent that is pressed against the inner wall 5f moves toward the opening 5da, as indicated by arrows, along the inner wall 5f. Since the axis m of the cylindrical surface is located closer to the opening 5da than is the shaft A, the diluent 8 moves to the opening 5da side of the shaft A. As a result, the diluent 8 having moved is subject to a centrifugal force of moving toward the opening 5da, and thus moves in the direction indicated by arrow n. Therefore, the diluent 8 is efficiently released to the accommodating section 11 through the opening 5da of the diluent container 5.

When the diluent 8 having flown into the retention chamber 26 exceeds a predetermined amount, the diluent 8 beyond the predetermined amount flows into the overflow chamber 31A via the channel 32. Since the inlet of the channel 33 connected to the overflow chamber 31A is located closer to the outer peripheral side than is the outlet of the channel 32 connected to the overflow chamber 31A, the diluent 8 having flown into the overflow chamber 31A does not stay in the overflow chamber 31A, but moves to the overflow chamber 31B via the channel 33. The diluent 8 further flows into the overflow chamber 31C via the channel 34. The overflow chamber 31C is connected to the overflow chamber 31D by the channel 35 provided on the inner peripheral side of the overflow chamber 31C. Therefore, when the diluent 8 having flown into the overflow chamber 31C reaches the inlet of the channel 35, the diluent 8 flows also into the overflow chamber 31D via the channel 35.

As shown in FIG. 11B, the diluent 8 also fills a part of the channel 41 and the channel 23. Specifically, within the channel 41, a portion that is located closer to the outer peripheral side than the same radial position as the radial position (distance) R1, from the shaft A, of the outlet of the channel 23 being connected to the overflow chamber 24 is filled with the diluent 8. Moreover, the amount of diluent 8 that retained in the retention chamber 22 is also defined by a portion of the space of the retention chamber 22 that lies outside of the radial position (distance) R1 from the shaft A. An amount of diluent 8 left by removing the diluent 8 remaining in the channel 41 (described later) from a totality of diluent 8 retained in the retention chamber 22, the part of the channel 41, and the channel 23 is used for diluting the analyte. Since the amount of diluent 8 to be retained in the retention chamber 22 and the channel 41 is defined by the radial position R1, the diluent 8 to be used for analyte dilution becomes quantified at this point.

Similarly, the diluent 8 also fills a part of the channel 27 and the channel 32. Specifically, within the channel 27, a portion that is located closer to the outer peripheral side than the same radial position as the radial position (distance) R2, from the shaft A, of the outlet of the channel 32 being connected to the overflow chamber 31A is filled with the diluent 8. Similarly, the amount of diluent 8 retained in the retention chamber 26 is also defined by a portion of the space of the retention chamber 26 that lies outside of the radial position (distance) R2 from the shaft A. An amount of diluent 8 left by removing the diluent 8 remaining in the channel 27 (described late) from a totality of diluent 8 retained in the retention chamber 26, the part of the channel 27, and the channel 32 is used for dissolving the reagent. Since the amount of diluent 8 to be retained in the retention chamber 26 and the channel 27 is defined by the radial position R2, the diluent 8 to be used for preparing the reagent solution becomes quantified at this point.

(4) Measurement of the Sample Liquid

Figure 13A:
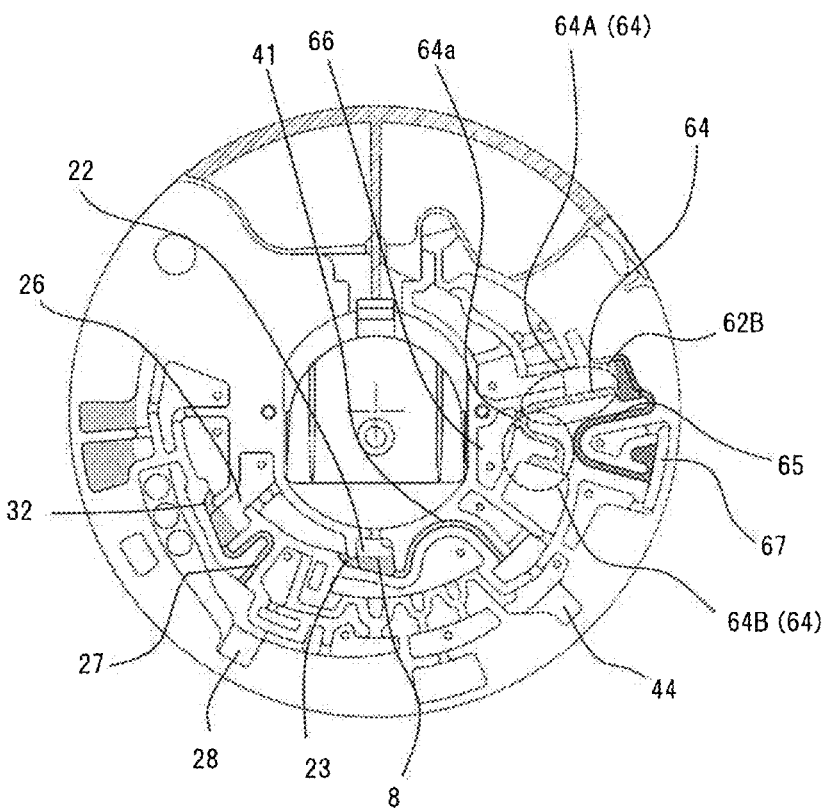
FIG. 13A is a diagram showing the positioning of a liquid in a sample analysis substrate during operation of the sample analysis system.

Next, rotation of the turntable 202 is stopped. As described earlier, the inlet of the channel 64 is in contact with the plasma component 18a and the corpuscle component 18b. However, since the plasma component 18a is lower in viscosity than the corpuscle component 18b, as shown in FIG. 13A, the plasma component 18a is sucked up to the channel 64 with higher priority by capillary force, and the channel 64 becomes filled with the plasma component 18a. After the plasma component 18a is sucked up to the channel 64, the corpuscle component 18b may also be sucked up.

The channel 64 includes: a bent portion 64a that is bent toward the inner peripheral side; and portions 64A and 64B which are located respectively on the inlet side and on the outlet side of the portion of the bent portion 64a that is located at the innermost peripheral side. Since the plasma component 18a is first sucked up to the channel 64, the corpuscle component 18b will just fill a part of the portion 64A on the inlet side. In other words, even if the channel 64 sucks in the corpuscle component 18b, the plasma component 18a and the corpuscle component 18b will remain separated. As will be described later, since the portion 64B of the channel 64 is used for analyte measurement, the corpuscle component 18b is restrained from mixing into the analyte to affect the measurement. As the portion 64B of the channel 64 is filled with the plasma component 18a, the plasma component 18a for use in the measurement becomes quantified.

The corpuscle component 18b retained in the analyte chamber 62B is sucked up to the channel 65 by capillary force, and fills the channel 65.

The diluent 8 retained in the retention chamber 22 is sucked up to the channel 41 by capillary force, and fills the channel 41. Moreover, the diluent 8 retained in the retention chamber 26 is sucked up to the channel 27 by capillary force, and fills the channel 27.

Figure 13B:
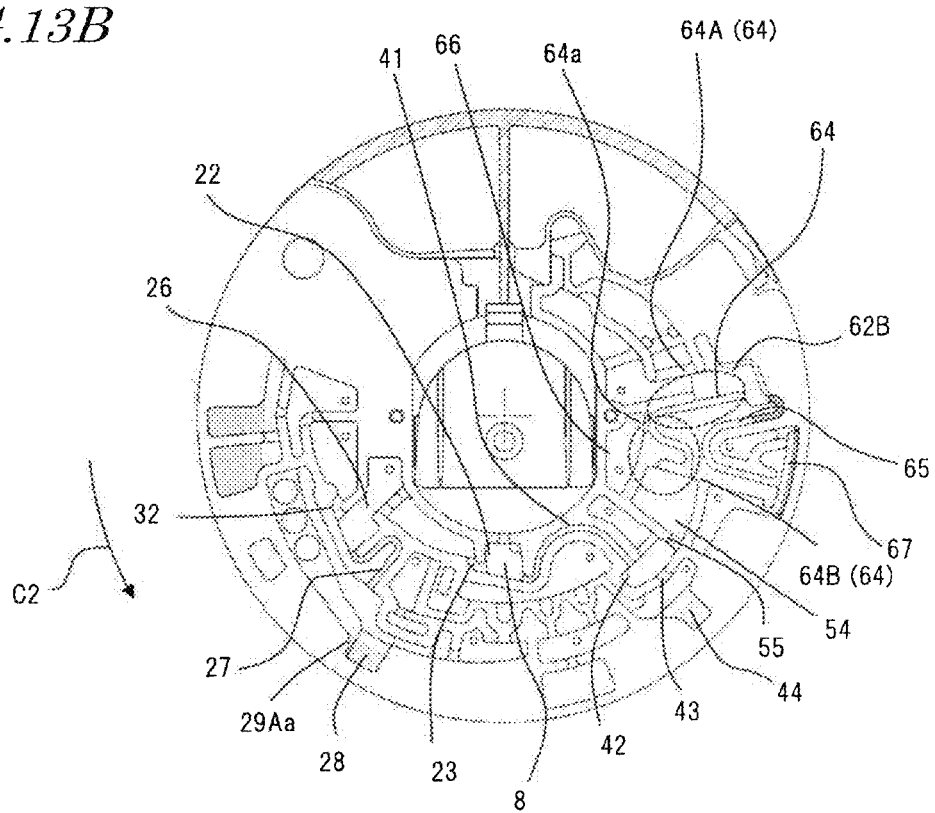
FIG. 13B is a diagram showing the positioning of a liquid in a sample analysis substrate during operation of the sample analysis system.

(5) Movement of the Diluent to the Measurement Chamber and the Mixing Chamber, Movement of the Analyte to the Mixing Chamber When the turntable 202 is rotated clockwise (C2 direction), since the channel 64 is connected to the air exposure chamber 66, the plasma component 18a and the corpuscle component 18b within the channel 64 become disrupted at the portion connected to the air exposure chamber 66. Specifically, the plasma component 18 and the corpuscle component 18b that were situated at the portion 64A move to the analyte chamber 62 owing to the centrifugal force associated with rotation. As shown in FIG. 13B, the plasma component 18a and the corpuscle component 18b having moved to the analyte chamber 62B join the corpuscle component 18b that was situated at the analyte chamber 62B, and pass through the channel 65 to move to the overflow chamber 67.

On the other hand, the plasma component 18a which was situated in the portion 64 passes through the chamber 54, the channel 55, the chamber 42, and the channel 43 to move to the mixing chamber 44.

The diluent 8 situated in the retention chamber 22, the channel 23, and the channel 41 passes through the channel 41, the chamber 42, and the channel 43 to move to the mixing chamber 44. As a result, the plasma component 18a and the diluent 8 become mixed in the mixing chamber 44, whereby the analyte solution is prepared.

Figure 14A:
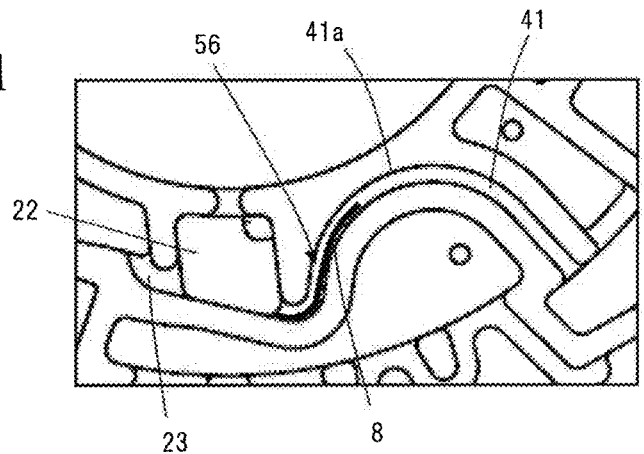
FIG. 14A is an enlarged view showing positioning of liquids within the sample analysis substrate during operation of the sample analysis system.

In the meantime, as the transfer of the diluent 8 progresses, the channel 23 and the retention chamber 22 become empty, after which the diluent 8 becomes situated only in the channel 41; then, as shown in FIG. 14A, the diluent 8 in the channel 41 is pressed against the outer peripheral side of the inner wall in the channel 41 owing to centrifugal force, whereby an airway 56 is created at the inner peripheral side in the portion of the bent portion 41a of the channel 41 that is located on the retention chamber 22 side. Once the airway 56 is created, the diluent 8 will no longer be transferred. Therefore, a part of the diluent 8 remains in the channel 41.

Figure 14B:
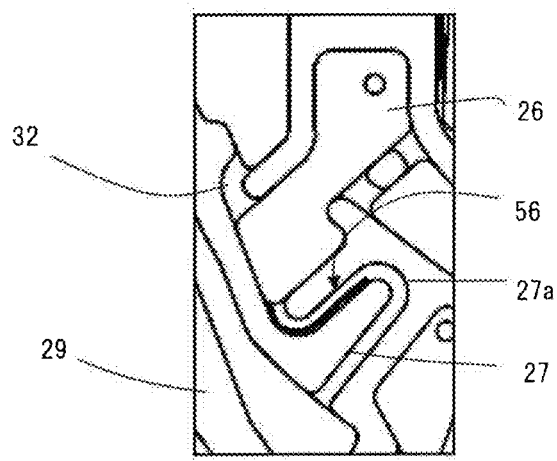
FIG. 14B is an enlarged view showing positioning of liquids within the sample analysis substrate during operation of the sample analysis system.

Similarly, the diluent 8 that is situated in the retention chamber 26, the channel 32 and the channel 27 passes through the channel 27 to move to the reagent chamber 29. As the movement of the diluent 8 progresses, the channel 32 and the retention chamber 26 become empty, after which the diluent 8 becomes situated only in the channel 27; then, as shown in FIG. 14B, the diluent 8 in the channel 27 is pressed against the outer peripheral side of the inner wall in the channel 27 owing to centrifugal force, whereby an airway 56 is created at the inner peripheral side in the portion of the bent portion 27a of the channel 27 that is located on the retention chamber 26 side. Once the airway 56 is created, the diluent 8 will no longer be transferred. Therefore, a part of the diluent 8 remains in the channel 27.

The reagent chamber 29 includes a portion 29A which is subject to capillary force and a portion 29B which is substantially not subject to capillary force. The portion 29A and the portion 29B each extend in a substantially circumferential direction, such that the portion 29B is located closer to the inner peripheral side than is the portion 29A. The portion 29B functions as an airway for discharging air voids at the time when the diluent becomes retained at the portion 29A owing to capillary force (prevention of admixing of air voids at the portion 29A).

In the portion 29A, one or more reagents 30 are disposed. In the case where the sample analysis substrate 1 contains two or more reagents 30, the plurality of reagents are to be disposed essentially along the peripheral direction.

The measurement chamber 28 is located adjacent to the portion 29A and the portion 29B of the reagent chamber 29. The portion 29A is adjacent to the measurement chamber 28 along the peripheral direction, and one end 29Aa of the portion 29A is in contact with the outer peripheral side of the measurement chamber 28. Moreover, the measurement chamber 28 is located closer to the outer peripheral side than is the substantial region of the portion 29A of the reagent chamber 29.

In the present embodiment, the outlet of the channel 27 is connected to the portion 29B of the reagent chamber 29. Therefore, when the diluent 8 moves from the channel 27 to the reagent chamber 29, it moves to a part of the portion 29A via the portion 29B, and further to the measurement chamber 28. As a result, the diluent 8 wets a part of the portion 29A, which is a capillary area, and moves to the measurement chamber 28. This enhances wettability of the portion 29A of the reagent chamber 29 such that, when the diluent 8 is to be moved to the reagent chamber 29 in the following step, the diluent 8 can move smoothly.

Moreover, no air holes are provided in the reagent chamber 29 and the measurement chamber 28. As a result, when adjusting the reagent solution in the next step, the reagent solution can be restrained from leaking out of air holes. The measurement chamber 28 is connected to the air exposure chamber 47 via the channel 48. Therefore, when the diluent 8 is moved to the reagent chamber 29, the reagent chamber 29 and the measurement chamber 28 do not become hermetically-sealed vessels, so that air in the reagent chamber 29 and the measurement chamber 28 can be released from the air exposure chamber 47 via the channel 48. This enables a smooth movement of the diluent 8 into the reagent chamber 29.

(6) Preparation of the Reagent Solution and the Analyte Solution

Figure 15A:
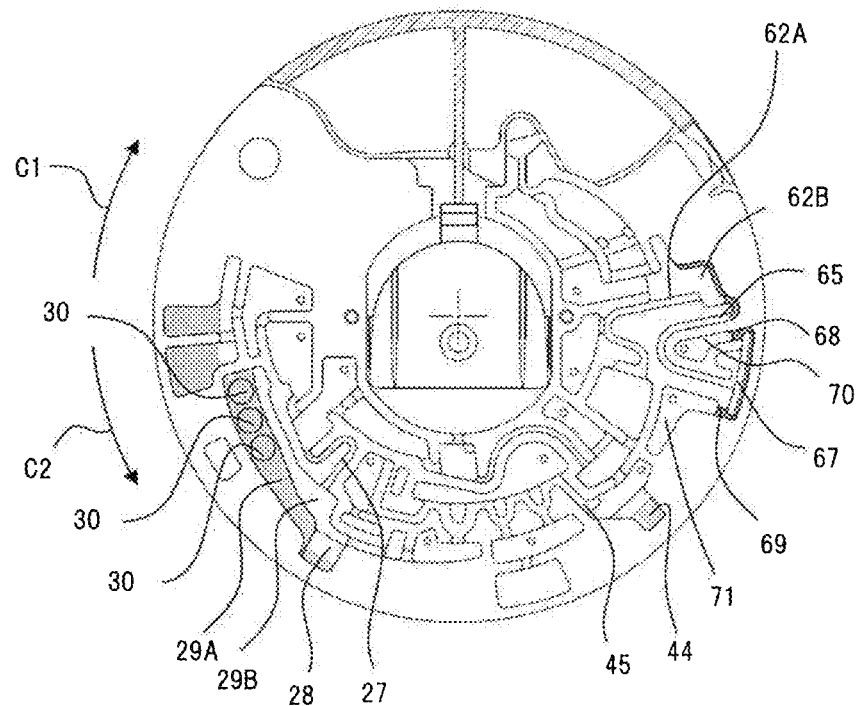
FIG. 15A is a diagram showing the positioning of a liquid in a sample analysis substrate during operation of the sample analysis system.

Rotation of the turntable 202 is stopped, and, for example, the sample analysis substrate 1 may be stopped at a rotation angle shown in FIG. 15A. Furthermore, the turntable 202 is swung, i.e., rotated forward and rotated backward, with a frequency of 5 to 80 Hz, so as to apply to the sample analysis substrate 1 a swing that results in a movement range of about ±1 mm on the outer periphery of the sample analysis substrate 1 from this rotation angle. For this angle, a rotation angle is chosen which will not bring the analyte solution in the mixing chamber 44 into contact with the inlet of the channel 45 connected to the mixing chamber 44 even if any swing is made.

Through the aforementioned swing, the diluent 8 having been transferred into the mixing chamber 44 and the plasma component 18a are stirred, whereby the analyte solution is prepared.

Moreover, the diluent 8 having been transferred to the measurement chamber 28 is sucked up to the portion 29A of the reagent chamber 29 by capillary force, whereby the reagent 30 is dissolved in the diluent 8, and the reagent solution is prepared. As mentioned above, no atmospheric air holes are provided in the measurement chamber 28 and the reagent chamber 29, and therefore the reagent solution will not leak through atmospheric air holes with the swing.

Moreover, the diluent 8 remains in the channel 27 connected to the reagent chamber 29. Therefore, the reagent solution is restrained from flowing from the channel 27 into the retention chamber 26.

Furthermore, the measurement chamber 28 is connected to the air exposure chamber 47 via the channel 48, and the air exposure chamber 47 is further connected to the channel 45 for measuring the analyte solution. Therefore, when the swing causes the measurement chamber 28 to the channel 48 to be filled with the reagent solution, as shown in FIG. 15C, the two channels 27 and 48 connected to the chamber 29 and the measurement chamber 28 become filled with the liquid, whereby airtightness of the reagent chamber 29 and the measurement chamber 28 is maintained. As a result, there is no need to restrict the frequency of the swing for dissolving and stirring the reagent, and, as mentioned above, the swing condition for stirring can be chosen just so that the analyte solution in the mixing chamber 44 will not come in contact with the inlet of the channel 45 connected to the mixing chamber 44.

Moreover, the overflow chamber 67 is shaped so as to extend along the peripheral direction, and an its both ends, the overflow chamber 67 is connected to the air exposure chambers 70 and 71 via the channels 68 and 69. The channels 68 and 69 are located so as to be in contact with the discharged sample liquid, which contains the plasma component 18a and the corpuscle component 18b having been discharged to the overflow chamber 67. Therefore, the sample liquid is sucked up by the capillary force in the channels 68 and 69, thus closing communication between the air exposure chambers 70 and 71 and the overflow chamber 67. Moreover, for the reasons described with reference to FIGS. 14A and 14B, the discharged sample liquid remains in the channel 65. This makes it possible to hermetically seal the overflow chamber 67 in a state of negative pressure, thereby restraining the sample liquid 18 that has moved to the overflow chamber 67 from flowing out.

Although two channels to communicate with the atmospheric air are provided in the overflow chamber 67, similar effects can be obtained by providing only one of these channels. In this case, however, when the sample liquid is discharged from the analyte chamber 62B into the overflow chamber 67, the channel 68 or the channel 69 may become filled with the sample liquid 18 part of the way, thus causing the inside of the overflow chamber 67 to be pressurized, possibly making it impossible for the sample liquid to further move to the overflow chamber 67. In this case, there is a chance for the sample liquid 18 remaining in the analyte chamber 62B to move to the mixing chamber 44 via the channel 64 through subsequent steps. In this regard, a structure having two channels and two air exposure chambers will be advantageous. Moreover, a portion that is conducive to capillary force may be formed on the outer peripheral side of the analyte chamber 62B. With such structure, the sample liquid 18 that failed to be discharged can be retained in the analyte chamber 62B owing to capillary force.

(7) Moving the Reagent Solution to the Measurement Chamber

Figure 15B:
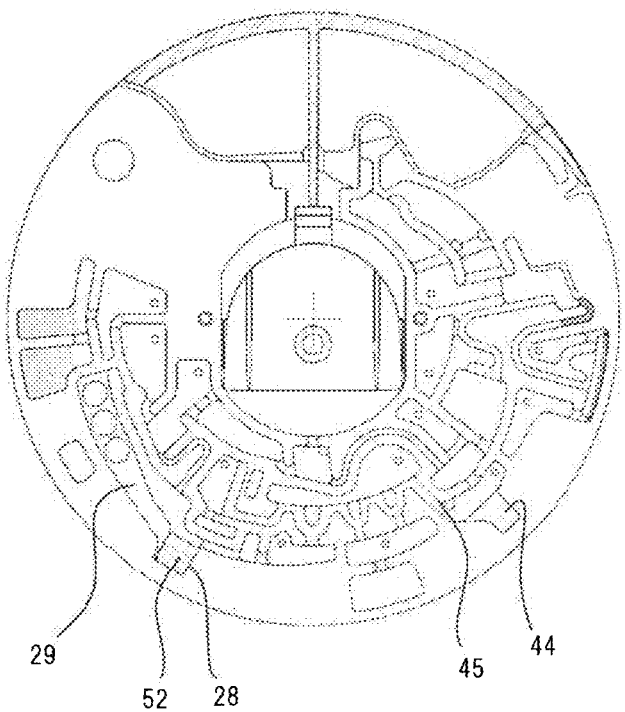
FIG. 15B is a diagram showing the positioning of a liquid in a sample analysis substrate during operation of the sample analysis system.
Figure 15C:
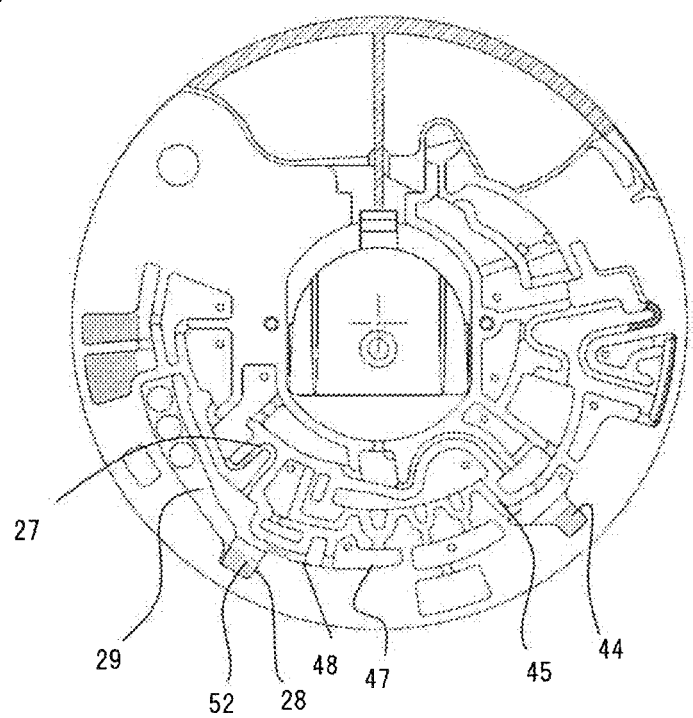
FIG. 15C is a diagram showing the positioning of a liquid in a sample analysis substrate during operation of the sample analysis system.

When the turntable 202 is rotated clockwise, the reagent solution which has been retained in the portion 29B of the reagent chamber 29 as shown in FIG. 15B moves to the measurement chamber 28 owing to centrifugal force.

When rotation of the turntable 202 is stopped, and the sample analysis substrate 1 is stopped at the rotation angular position shown in FIG. 15A, the reagent solution in the measurement chamber 28 again moves to the portion 29A of the reagent chamber 29. Through several times of repetitive rotation and stopping, preparation of the reagent in the measurement chamber 28 and preparation of the analyte solution in the mixing chamber 44 can be performed in a shorter time and with greater certainty than by such preparations being based on diffusion alone. After the turntable 202 is stopped, the aforementioned swing operation may be performed.

(8) Measurement of the Analyte Solution

Figure 16A:
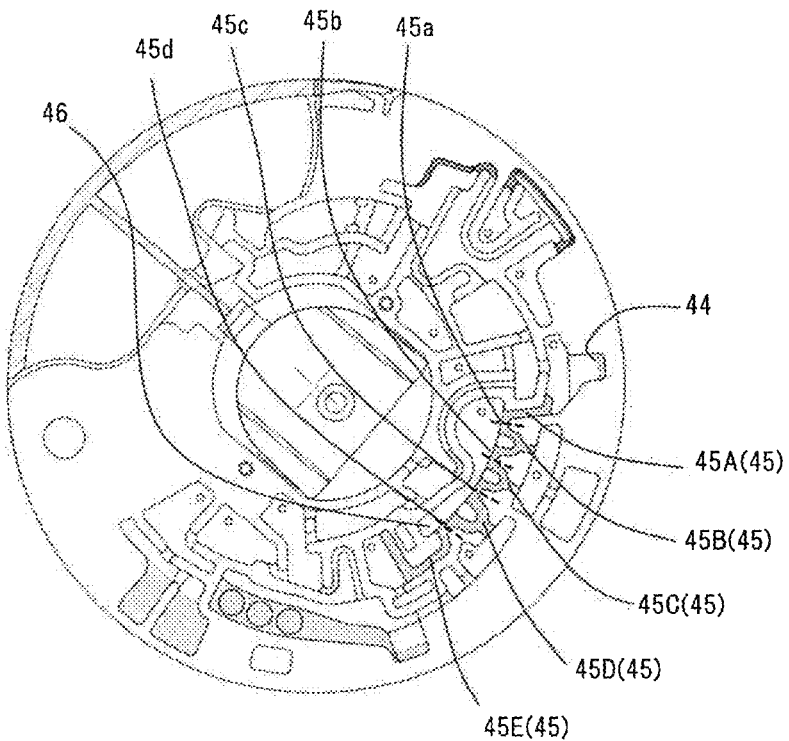
FIG. 16A is a diagram showing the positioning of a liquid in a sample analysis substrate during operation of the sample analysis system.

Rotation of the turntable 202 is stopped, and, for example, the sample analysis substrate 1 may be stopped at a rotation angle shown in FIG. 16A. Furthermore, the turntable 202 is swung with a frequency of 5 to 80 Hz, so as to apply to the sample analysis substrate 1 a swing that results in a movement range of about ±1 mm on the outer periphery of the sample analysis substrate 1 from this rotation angle. This operation brings the analyte solution retained in the mixing chamber 44 into contact with the channel 45 whose inlet is connected at the inner peripheral side of the mixing chamber 44. The analyte solution is sucked into the channel 45 by capillary force, whereby the channel 45 becomes filled with the analyte solution.

Figure 14C:
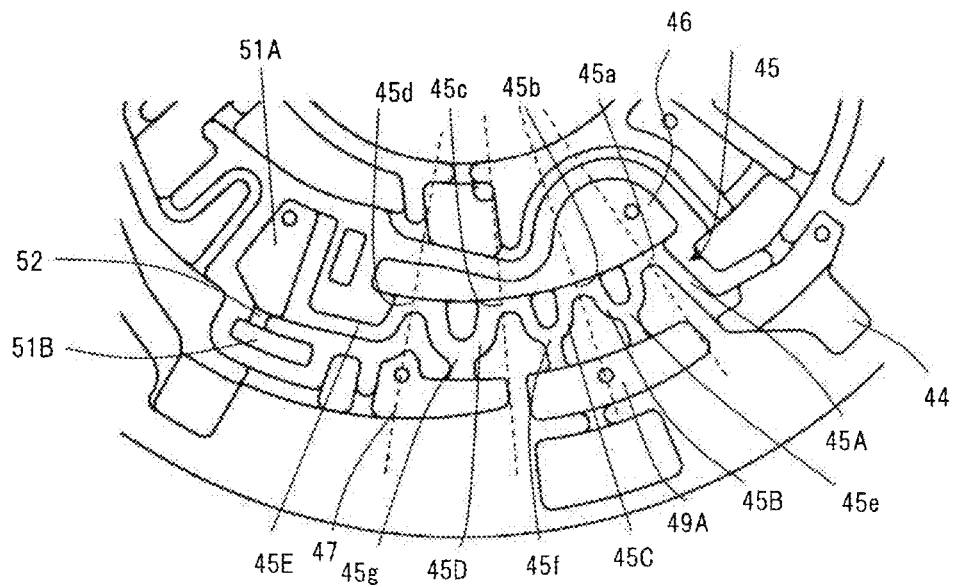
FIG. 14C is an enlarged view showing a part of the microchannel structure of the sample analysis substrate.

FIG. 14C shows the channel 45 enlarged. The channel 45 includes: convex portions 45a, 45b, 45c and 45d which are bent toward the inner peripheral side; and convex portions 45e, 45f and 45g which are bent toward the outer peripheral side. The convex portions 45a, 45b, 45c and 45d are connected to the air exposure chamber 46; the convex portions 45e and 45f are connected to the overflow chamber 49A; and the convex portion 45g is connected to the air exposure chamber 47. The channel 45 is split into portions 45A through 45E by a straight line (shown by a broken line in FIG. 14C) in a radial direction passing through the centers of the convex portions 45a, 45b, 45c and 45d. As will be described later, the analyte solution situated in the portion 45D of the channel 45 is used for measurement, whereas the analyte solution in any other portion is not used for measurement. Since the portion 45D is completely filled with the analyte solution, the analyte solution is measured on the basis of the volumetric capacity of she channel 45.

(9) Transferring the Analyte Solution into the Measurement Chamber

Figure 16B:
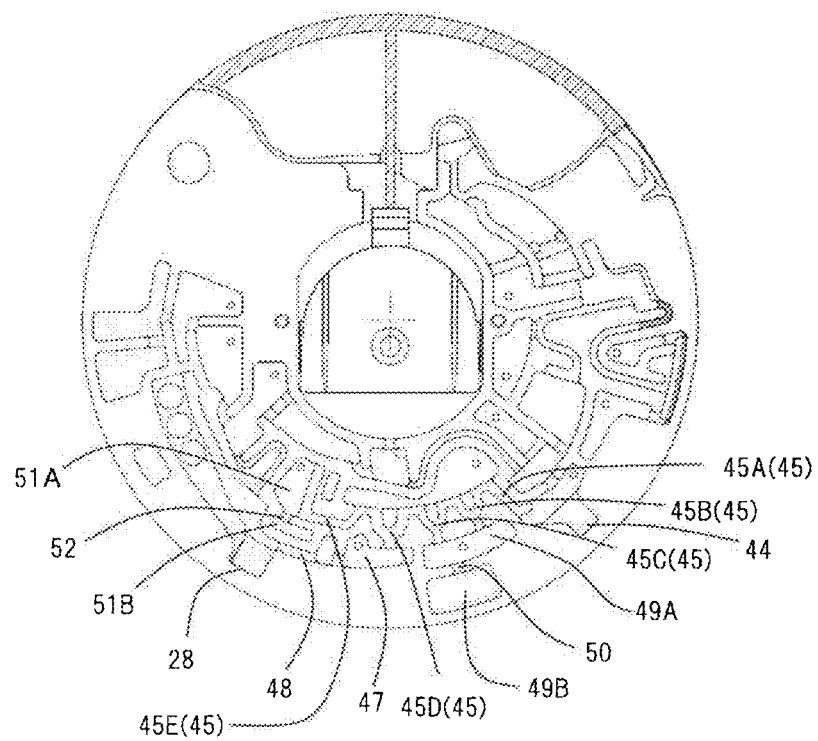
FIG. 16B is a diagram showing the positioning of a liquid in a sample analysis substrate during operation of the sample analysis system.

As shown in FIG. 16A, when the turntable 202 is rotated clockwise, the analyte solution retained in the channel 45 becomes disrupted as indicated by broken lines at the positions of convex portions 45a, 45b, 45c and 45d where it is in contact with the air exposure chamber 46, because air enters through the air exposure chamber 46. In other words, the analyte solution becomes divided so as to correspond to the portions 45A through 45E. As shown in FIG. 16A and FIG. 16B, the analyte solution situated in the portion 45A returns to the mixing chamber 44. The analyte solution situated in the portion 45B and the portion 45C moves to the overflow chamber 49A, and further moves to the overflow chamber 49B via the channel 50. The analyte solution situated in the portion 45D moves to the air exposure chamber 47, and moves to the measurement chamber 28 via the channel 48. The analyte solution situated in the portion 45E moves to the overflow chamber 51A, and moves to the overflow chamber 51B via the channel 52.

The analyte solution having moved to the measurement chamber 28 becomes mixed with the reagent solution retained in the measurement chamber 28. Since the reagent is dissolved in the diluent in advance, the reagent in the reagent solution and the analyte in the analyte solution react at a high rate, and reaction occurs uniformly throughout the entirety of mixed solution. Moreover, the analyte and the reagent react almost simultaneously throughout the entirety of the mixed solution. In these aspects, fluctuations due to reproducibility of measurement and non-uniformity of measurement, etc., are suppressed, whereby a considerable improvement in the measurement accuracy can be obtained. No air holes are provided in the overflow chambers 49B and 51B. This restrains any analyte solution that was not used in the measurement from leaking out of the overflow chambers 49B and 51B.

(10) Mixing of the Analyte Solution and the Reagent Solution

Figure 17A:
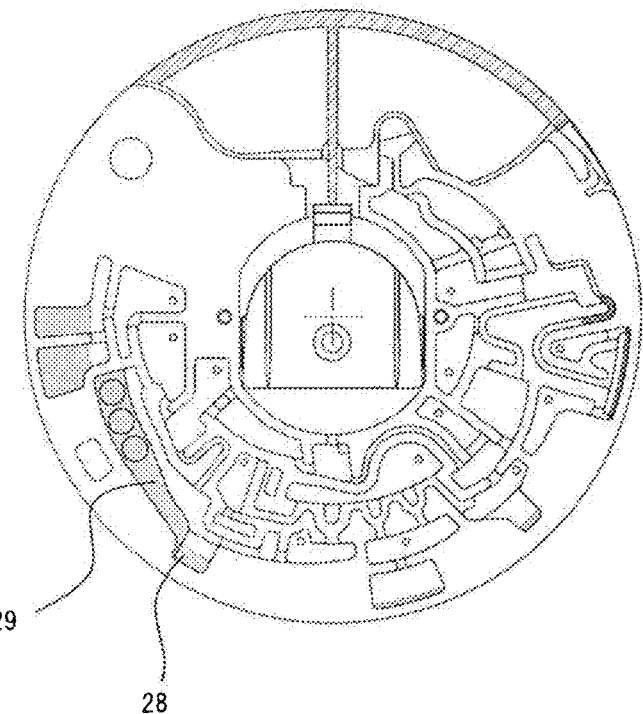
FIG. 17A is a diagram showing the positioning of a liquid in a sample analysis substrate during operation of the sample analysis system.

When the rotation of the turntable 202 is stopped, the mixed solution of the reagent solution and the analyte solution having been transferred to the measurement chamber 28 is sucked up to the portion 29A of the reagent chamber 29 by capillary force as shown in FIG. 17A.

Herein, by swinging the turntable 202 with a frequency of 5 to 80 Hz so as to apply to the sample analysis substrate 1 a swing that results in a movement range of about ±1 mm on the outer periphery the sample analysis substrate 1, the mixed solution retained in the measurement chamber 28 and the portion 29A of the reagent chamber 29 can be stirred, so that the analyte and the reagent will uniformly disperse within the diluting solution, thus promoting reaction between them. As described earlier, once the channel 48 becomes filled with the mixed solution, airtightness of the reagent chamber 29 and the measurement chamber 28 will be maintained. Therefore, there is not need to limit the frequency of the swing for mixing, and the swing operation may be controlled to an arbitrary intensity.

(11) Measurement

Figure 17B:
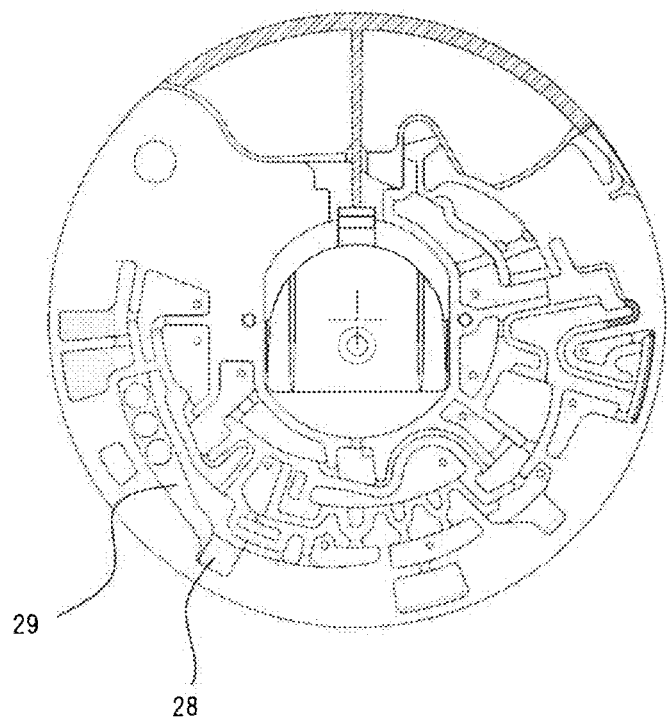
FIG. 17B is a diagram showing the positioning of a liquid in a sample analysis substrate during operation of the sample analysis system.

When the turntable 202 is rotated clockwise, as shown in FIG. 17B, the mixed solution retained the proton 29A of the reagent chamber 29 is transferred to the outer peripheral side of the measurement chamber 28 by centrifugal force and retained there.

Thereafter, the control circuit 205 receives a detection value of the photodetector 207b which is obtained with the timing that the measurement chamber 28 passes between the light source 207a and the photodetector 207b of the optical measurement unit 207, and applies computation to this detection value to calculate a concentration of the analyte. The control circuit 205 may acquire in advance a detection value of the time when the prepare reagent solution becomes situated in the measurement chamber 28, and use this value as a reference, thereby improving the measurement accuracy.

Although the present embodiment illustrates that the analyte concentration is measured by using an optical unit, the sample analysis device may electrically access the mixed solution of the reagent solution and the analyte solution disposed in the measurement chamber 28 to measure the analyte concentration.

Other Implementations

Although the embodiment illustrates that a sample liquid containing an analyte is diluted with a diluent to prepare an analyte solution, the sample liquid containing the analyte may not be diluted with a diluent, but be allowed to react with a reagent solution. In this case, the analyte chamber may be connected to the measurement chamber via the analyte path, not by way of the mixing chamber. In this case, too, since the reagent is dissolved win the diluent, as described above, the analyte and the reagent can uniformly react, whereby the measurement accuracy can be improved.

Although the embodiment illustrates that the retention chamber 26 is connected to the reagent chamber 29 via the channel 27, the channel 27 may be connected to the measurement chamber 28. In this case, too, since the portion 29A of the reagent chamber 29 lies close to the outermost peripheral side wall of the measurement chamber 28, when the diluent is transferred to the measurement chamber 28 via the channel 27, because of the diluent having transferred to the measurement chamber 28, a part of the portion 29A of the reagent chamber 29 is wetted with the diluent. Therefore, by stopping rotation of the sample analysis substrate, the diluent can be smoothly sucked up to the portion 29A of the reagent chamber 29.

The present embodiment illustrates that the channel 45 includes the portions 45A through 45E for measuring the analyte solution; however, the structure of the channel 45 is not limited thereto so long as an amount of analyte solution needed for measurement can be measured.

Moreover, the microchannel structure to be formed on the sample analysis substrate, i.e., the numbers of channels and chambers, shape, positioning, etc., are only exemplary, and the above embodiment is not limiting.

REFERENCE SIGNS LIST 1 sample analysis substrate
2 protection cap
2a, 2b aperture
2c first face
2d side face
2e second face
2f notch
2j, 2h edge
3 base substrate
3a first face
3b second face
3c micro channel structure
3n recessed portion
4 cover substrate
4a first face
4b second face
4aa aperture
5 diluent container
5a first face
5b second face
5c curved surface
5d side face
5e accommodating space
5f inner wall
5aa recess
5da opening
7a, 7b bump
8 diluent
9 sealing member
10 latch
10c abutting face
10e bump
11 accommodating section
12 protruding portion
12c notch
12d abutting face
13 injection port
14 unsealing rib
15 rotation support
15c bump
17 introductory section
18 sample liquid
18a plasma component
18b corpuscle component
19 sample liquid
21, 23, 25, 27, 32-35, 41, 43, 48 channel
50, 52, 55, 64, 65, 68, 69 channel
22, 26 retention chamber
24, 31A-31D, 49A, 49B, 67, 51A, 51B overflow chamber
28 measurement chamber
29 reagent chamber
29A capillary portion
29B non-capillary portion
29Aa one end
30 reagent
42, 47, 54 chamber
44 mixing chamber
45 channel
45a-45d convex portion bent toward the inner peripheral side
45e-45g convex portion bent toward the outer peripheral side
45A-45E portion
46, 47, 66, 70, 71 air exposure chamber
56 airway
61 channel
61a recess
61b bent portion
62A-62C analyte chamber
64 channel
64a bent portion
64A portion located on the inlet side
64B portion located on the outlet side
85 air hole
121 chamber
122 outer side face
123 left side face
124 right side face
125 solution
150 fixation jig
150a protrusion
151 pressurization jig
200 sample analysis device
201 motor
202 turntable
202a upper face
202c center bump
202d recess
202f gear
202t taper
203 origin detector
203a light source
203b photodetector
203c origin detection circuit
204 rotation angle detection circuit
205 control circuit
206 drive circuit
207 optical measurement unit
207a light source
207b photodetector
207c detection circuit
208 touch screen panel
209 input device
250 housing
250c accommodation
251 door
252 power switch
253 clamper

The invention claimed is:
1. A sample analysis system, comprising:
a sample analysis substrate in which transfer of a liquid is effected through rotational motions; and a sample analysis device, wherein:
the sample analysis substrate includes:
  a substrate having a rotation axis;
  a first retention chamber disposed in the substrate and configured to retain a first diluent;
  a measurement chamber disposed in the substrate;
  at least one reagent;
  a reagent chamber disposed in the substrate and having the at least one reagent disposed therein, the reagent chamber being connected to the measurement chamber;
  a first diluent path disposed in the substrate, and disposed between and connecting the first retention chamber and the measurement chamber or the reagent chamber;
  a second retention chamber that is different from the first retention chamber, is disposed in the substrate and configured to retain a second diluent;
  an analyte chamber disposed in the substrate and configured to retain an analyte;
a mixing chamber disposed in the substrate;
  an analyte path disposed in the substrate, and disposed between and connecting the analyte chamber and the mixing chamber;
  a second diluent path disposed in the substrate, and disposed between and connecting the second retention chamber and the mixing chamber;
  a mixed solution path disposed in the substrate, and disposed between and connecting the mixing chamber and the measurement chamber; and
  a diluent container that is different from the first retention chamber and the second retention chamber, is connected to the second retention chamber and retains a diluent to be supplied to the second retention chamber,
the diluent container is connected to the first retention chamber through the second retention chamber,
the reagent chamber includes a capillary region, the reagent being disposed in the capillary region,
the sample analysis device includes:
  a motor having a turntable on which the sample analysis substrate is mountable, the motor rotating the sample analysis substrate around a rotation axis inclined by an angle which is greater than 0° and smaller than or equal to 90° from the direction of gravity;
  a rotation angle detection circuit to detect an angle of a shaft of the motor;
  an origin detector to detect an origin to serve as a reference for the analysis substrate;
  a driver driving circuit to, based on a result of detection by the rotation angle detection circuit, control rotation of the motor and an angle of the motor when stopping; and
  a control circuit including an arithmetic unit, a memory, and a program which is stored in the memory and configured so as to be executable by the arithmetic unit, wherein based on the program, the control circuit controls operations of the motor, the rotation angle detection circuit, the origin detector, and the driver driving circuit,
the control circuit is configured to control the sample analysis device on which the sample analysis substrate is mounted to perform the operations including steps of, when the sample analysis substrate having the diluent retained in the diluent container is mounted on the turntable of the sample analysis device:

(a) distributing the diluent from the diluent container to the first retention chamber and the second retention chamber;
(b) preparing a reagent solution using the diluent distributed to the first retention chamber;
(c) diluting the analyte at the mixing chamber using the diluent distributed to the second retention chamber; and
(d) transferring the analyte diluted in step (c) to the measurement chamber and mixing the diluted analyte with the reagent solution already prepared in step (b), and step (b) includes steps of:
  (b-1) rotating the sample analysis substrate to transfer the diluent retained in the first retention chamber to the measurement chamber via the first diluent path;
  (b-2) stopping rotation of the sample analysis substrate to move the diluent in the measurement chamber to the capillary region of the reagent chamber to allow the plurality of reagents to be dissolved in the diluent, thus preparing the reagent solution; and
  (b-3) rotating the sample analysis substrate to move the reagent solution in the reagent chamber to the measurement chamber.

2. The sample analysis system of claim 1, wherein:
the measurement chamber and the reagent chamber do not have any air holes,
the first diluent path includes an inlet and an outlet, the outlet being a capillary channel connected to the measurement chamber, such that the outlet is disposed on an outer peripheral side of the rotation axis relative to the inlet, and that the capillary channel has a siphon shape which is bent toward an inner peripheral side relative to the inlet, and
the mixed solution path includes:
  a capillary channel having an inlet and an outlet, the outlet being connected to the measurement chamber; and
  a chamber being connected to the inlet of the capillary channel and having an air hole.

3. The sample analysis system of claim 1, wherein an outlet of a capillary channel of the first diluent path is connected to the reagent chamber.

4. The sample analysis system of claim 1, comprising a plurality of reagents, the plurality of reagents being disposed along a peripheral direction in the capillary region of the reagent chamber.

5. The sample analysis system of claim 4, wherein the measurement chamber includes a portion that is located closer to an outer peripheral side than a portion of the capillary region of the reagent chamber in which the plurality of reagents are disposed.

6. The sample analysis system of claim 1, wherein step (b) further comprises, between step (b-2) and step (b-3), a step of swinging the sample analysis substrate.

7. The sample analysis system of claim 1, wherein in step (b), step (b-2) and step (b-3) are repeated a plurality of times.

8. A sample analysis device used with a sample analysis substrate in which transfer of a liquid is effected through rotational motions, wherein the sample analysis substrate includes:
  a substrate having a rotation axis;
  a first retention chamber disposed in the substrate and configured to retain a first diluent;
  a measurement chamber disposed in the substrate;
  at least one reagent;

a reagent chamber disposed in the substrate and having the at least one reagent disposed therein, the reagent chamber being connected to the measurement chamber;

a first diluent path disposed in the substrate, and disposed between and connecting the first retention chamber and the measurement chamber or the reagent chamber;

a second retention chamber that is different from the first retention chamber, is disposed in the substrate and configured to retain a second diluent;

an analyte chamber disposed in the substrate and configured to retain an analyte;

a mixing chamber disposed in the substrate;

an analyte path disposed in the substrate, and disposed between and connecting the analyte chamber and the mixing chamber;

a second diluent path disposed in the substrate, and disposed between and connecting the second retention chamber and the mixing chamber;

a mixed solution path disposed in the substrate, and disposed between and connecting the mixing chamber and the measurement chamber; and a diluent container that is different from the first retention chamber and the second retention chamber, is connected to the second retention chamber and retains a diluent to be supplied to the second retention chamber, wherein the diluent container is connected to the first retention chamber through the second retention chamber, and the reagent chamber includes a capillary region, the reagent being disposed in the capillary region, the sample analysis device comprising:

a motor having a turntable on which the sample analysis substrate is mountable, the motor rotating the sample analysis substrate around a rotation axis inclined by an angle which is greater than 0° and smaller than or equal to 90° from the direction of gravity;

a rotation angle detection circuit to detect an angle of a shaft of the motor, and an origin detector to detect an origin to serve as a reference for the analysis substrate;

a driver driving circuit to, based on a result of detection by the rotation angle detection circuit, control rotation of the motor and an angle of the motor when stopping; and a control circuit including an arithmetic unit, a memory, and a program which is stored in the memory and configured so as to be executable by the arithmetic unit, wherein based on the program, the control circuit is configured to control operations of the motor, the rotation angle detection circuit, the origin detector, and the driver driving circuit, the control circuit is configured to control the sample analysis device on which the sample analysis substrate is mounted to perform the operations including steps of, when the sample analysis substrate having the diluent retained in the diluent container is mounted on the turntable of the sample analysis device:

(a) distributing the diluent from the diluent container to the first retention chamber and the second retention chamber;

(b) preparing a reagent solution using the diluent distributed to the first retention chamber;

(c) diluting the analyte at the mixing chamber using the diluent distributed to the second retention chamber; and (d) transferring the analyte diluted in step (c) to the measurement chamber and mixing the diluted analyte with the reagent solution already prepared in step (b), and step (b) includes steps of:

(b-1) rotating the sample analysis substrate to transfer the diluent retained in the first retention chamber to the measurement chamber via the first diluent path;

(b-2) stopping rotation of the sample analysis substrate to move the diluent in the measurement chamber to the capillary region of the reagent chamber to allow the plurality of reagents to be dissolved in the diluent, thus preparing the reagent solution; and (b-3) rotating the sample analysis substrate to move the reagent solution in the reagent chamber to the measurement chamber.

9. The sample analysis device of claim 8, wherein step (b) further comprises, between step (b-2) and step (b-3), a step of swinging the sample analysis substrate.

10. The sample analysis device of claim 8, wherein in step (b), step (b-2) and step (b-3) are repeated a plurality of times.

11. A method for controlling a sample analysis device and a sample analysis substrate in which transfer of a liquid is effected through rotational motions, wherein the sample analysis substrate includes:

a substrate having a rotation axis;

a first retention chamber disposed in the substrate and configured to retain a first diluent;

a measurement chamber disposed in the substrate;

at least one reagent;

a reagent chamber disposed in the substrate and having the at least one reagent disposed therein, the reagent chamber being connected to the measurement chamber;

a first diluent path disposed in the substrate, and disposed between and connecting the first retention chamber and the measurement chamber or the reagent chamber;

a second retention chamber that is different from the first retention chamber, is disposed in the substrate and configured to retain a second diluent;

an analyte chamber disposed in the substrate and configured to retain an analyte;

a mixing chamber disposed in the substrate;

an analyte path disposed in the substrate, and disposed between and connecting the analyte chamber and the mixing chamber;

a second diluent path disposed in the substrate, and disposed between and connecting the second retention chamber and the mixing chamber;

a mixed solution path disposed in the substrate, and disposed between and connecting the mixing chamber and the measurement chamber; and a diluent container that is different from the first retention chamber and the second retention chamber, is connected to the second retention chamber and retains a diluent to be supplied to the second retention chamber, wherein the diluent container is connected to the first retention chamber through the second retention chamber, and the reagent chamber includes a capillary region, the reagent being disposed in the capillary region, the sample analysis device including includes:

a motor having a turntable on which the sample analysis substrate is mountable, the motor rotating the sample analysis substrate around a rotation axis inclined by an angle which is greater than 0° and smaller than or equal to 90° from the direction of gravity;

a rotation angle detection circuit to detect an angle of a shaft of the motor;

an origin detector to detect an origin to serve as a reference for the analysis substrate;

a driver driving circuit to, based on a result of detection by the rotation angle detection circuit, control rotation of the motor and an angle of the motor when stopping; and a control circuit including an arithmetic unit, a memory, and a program which is stored in the memory and configured so as to be executable by the arithmetic unit, wherein based on the program, the control circuit is configured to control operations of the motor, the rotation angle detection circuit, the origin detector, and the driver driving circuit, the method comprising steps of, when the sample analysis substrate having the diluent retained in the dilution container is mounted on the turntable:
- (a) distributing the diluent from the diluent container to the first retention chamber and the second retention chamber;
- (b) preparing a reagent solution using the diluent distributed to the first retention chamber;
- (c) diluting the analyte at the mixing chamber using the diluent distributed to the second retention chamber; and
- (d) transferring the analyte diluted in step (c) to the measurement chamber and mixing the diluted analyte with the reagent solution already prepared in step (b), and step (b) includes steps of:
- (b-1) rotating the sample analysis substrate to transfer the diluent retained in the first retention chamber to the measurement chamber via the first diluent path;
- (b-2) stopping rotation of the sample analysis substrate to move the diluent in the measurement chamber to the capillary region of the reagent chamber to allow the plurality of reagents to be dissolved in the diluent, thus preparing a reagent solution; and
- (b-3) rotating the sample analysis substrate to move the reagent solution in the reagent chamber to the measurement chamber.

12. The method of claim 11, wherein step (b) further comprises, between step (b-2) and step (b-3), a step of swinging the sample analysis substrate.

13. The method of claim 11, wherein step (b-2) and step (b-3) are repeated a plurality of times.

* * * * *